(12) United States Patent
Mochizuki

(10) Patent No.: US 8,824,009 B2
(45) Date of Patent: Sep. 2, 2014

(54) DISPLAY PROCESSING APPARATUS, IMAGE FORMING SYSTEM, DISPLAY PROCESSING METHOD, AND COMPUTER-READABLE STORAGE MEDIUM

(75) Inventor: Toshihiro Mochizuki, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 165 days.

(21) Appl. No.: 13/610,018

(22) Filed: Sep. 11, 2012

(65) Prior Publication Data

US 2013/0063740 A1    Mar. 14, 2013

(30) Foreign Application Priority Data

Sep. 14, 2011  (JP) .................................. 2011-201107
Aug. 15, 2012  (JP) .................................. 2012-180281

(51) Int. Cl.
*G06K 1/00* (2006.01)

(52) U.S. Cl.
USPC .............. 358/1.9; 358/1.18; 358/2.1; 347/45; 347/95

(58) Field of Classification Search
USPC .................. 358/1.9, 1.18, 2.1; 347/45, 95
See application file for complete search history.

(56) References Cited

U.S. PATENT DOCUMENTS

| 8,622,496 B2* | 1/2014 | Yoshida ............................ 347/9 |
| 2007/0164505 A1 | 7/2007 | Ishibashi et al. |
| 2008/0236736 A1 | 10/2008 | Nakamura et al. |
| 2012/0062956 A1 | 3/2012 | Kitagawa et al. |
| 2012/0063802 A1 | 3/2012 | Suzuki et al. |

FOREIGN PATENT DOCUMENTS

| JP | 2007-206561 | 8/2007 |
| JP | 2008-145784 | 6/2008 |

* cited by examiner

*Primary Examiner* — Jamares Q Washington
(74) *Attorney, Agent, or Firm* — Harness, Dickey & Pierce, P.L.C.

(57) ABSTRACT

A display processing apparatus includes a gloss-control plane generating unit configured to generate gloss-control plane data for specifying a type of a surface effect applied to a recording medium and an area in a recording medium to which the surface effect is applied; an obtaining unit configured to obtain replacement information that is used to replace a type of the surface effect that is not available in a device configuration with a type of the surface effect that is available in the device configuration; a replacing unit configured to replace the type of the surface effect designated by the designation information with the type of the available surface effect using the replacement information obtained by the obtaining unit; and a preview image generating unit configured to generate a preview image based on the gloss-control plane data having an area to which the available surface effect is to be applied.

8 Claims, 28 Drawing Sheets

COLOR PLANE IMAGE DATA

| GLOSSY EFFECT | GLOSSINESS | DEVIATION |
|---|---|---|
| PREMIUM GLOSS (PG) | Gs≥80 | ΔGs≤10 |
| GLOSS (G) | Gs=Gs (SOLID) | ΔGs≤10 |
| MATTE (M) | Gs=Gs (1C30% HALFTONE) | ΔGs≤10 |
| PREMIUM MATTE (PM) | Gs≤10 | ΔGs≤10 |

GLOSS-CONTROL PLANE IMAGE DATA

▨ : AREA TO WHICH PG IS DESIGNATED (DENSITY VALUE 98%)

▩ : AREA TO WHICH G IS DESIGNATED (DENSITY VALUE 90%)

▤ : AREA TO WHICH M IS DESIGNATED (DENSITY VALUE 16%)

CLEAR PLANE IMAGE DATA

FIG.7

| TABLE NUMBER | | 1 | 2 | 3 | 4 | 5 | 6 | |
|---|---|---|---|---|---|---|---|---|
| DEVICE CONFIGU-RATION INFOR-MATION | GLOSSER | X | X | X | X | X | | |
| | NORMAL FIXING POST-PROCESSING DEVICE | X | | | | | | ... |
| | LOW-TEMPERATURE FIXING POST-PROCESSING DEVICE | X | X | X | | | | |
| PRIORITY INFORMATION | | - | ON GLOSS | ON TYPE | ON GLOSS | ON TYPE | - | |

FIG.8

SURFACE EFFECT SELECTION TABLE CORRESPONDING TO TABLE NUMBER "1"

| DENSITY VALUE [%] | DENSITY VALUE | TYPE OF DESIGNATED SURFACE EFFECT | ON/OFF INFOR-MATION | Clr-1 | Clr-2 | Clr-3 | TYPE OF PRACTICABLE SURFACE EFFECT |
|---|---|---|---|---|---|---|---|
| 94% TO 98% | "238" TO "255" | PG | ON | INVERSE MASK 1 | no data | no data | PG |
| 84% TO 90% | "212" TO "232" | G | ON | INVERSE MASK m | SOLID | no data | G |
| 10% TO 16% | "23" TO "43" | M | ON | no data | halftone-n | no data | M |
| 0% TO 6% | "1" TO "17" | PM | ON | no data | no data | SOLID | PM |

FIG.13

SURFACE EFFECT SELECTION TABLE CORRESPONDING TO TABLE NUMBER "2"

| DENSITY VALUE [%] | DENSITY VALUE | TYPE OF DESIGNATED SURFACE EFFECT | ON/OFF INFOR-MATION | Clr-1 | Clr-3 | TYPE OF PRACTICABLE SURFACE EFFECT |
|---|---|---|---|---|---|---|
| 94% TO 98% | "238" TO "255" | PG | ON | INVERSE MASK 1 | no data | PG |
| 84% TO 90% | "212" TO "232" | G | ON | INVERSE MASK m | no data | PG |
| 10% TO 16% | "23" TO "43" | M | ON | no data | SOLID | PM |
| 0% TO 6% | "1" TO "17" | PM | ON | no data | SOLID | PM |

| TYPE OF SURFACE EFFECT DESIGNATED BY USER | DENSITY VALUE OF GLOSS-CONTROL PLANE [%] |
|---|---|
| PG | 98% |
| G | 90% |
| M | 16% |
| PM | 6% |

GLOSS-CONTROL PLANE IMAGE DATA

▨ : AREA TO WHICH PG IS DESIGNATED (DENSITY VALUE 98%)

▧ : AREA TO WHICH G IS DESIGNATED (DENSITY VALUE 90%)

▤ : AREA TO WHICH M IS DESIGNATED (DENSITY VALUE 16%)

FIG.26

| TABLE NUMBER | | 1 | 2 | 3 | 4 | 5 | 6 | |
|---|---|---|---|---|---|---|---|---|
| DEVICE CONFIGU-RATION INFORMATION | GLOSSER | X | X | X | X | X | X | ... |
| | NORMAL FIXING POST-PROCESSING DEVICE | X | X | | | | | |
| | LOW-TEMPERATURE FIXING POST-PROCESSING DEVICE | X | X | X | X | | | |
| NUMBER OF TIMES INFORMATION | | 1 | 2 | 1 | 2 | 1 | 2 | |

FIG.27

SURFACE EFFECT SELECTION TABLE CORRESPONDING TO TABLE NUMBER "4"

| DENSITY VALUE [%] | DENSITY VALUE | TYPE OF DESIGNATED SURFACE EFFECT | ON/OFF INFORMATION AT FIRST TIME OF CONVEYANCE | ON/OFF INFORMATION AT SECOND TIME OF CONVEYANCE | Clr-1 AT FIRST TIME OF CONVEYANCE | Clr-1 AT SECOND TIME OF CONVEYANCE | Clr-3 AT FIRST TIME OF CONVEYANCE | Clr-3 AT SECOND TIME OF CONVEYANCE | TYPE OF PRACTICABLE SURFACE EFFECT |
|---|---|---|---|---|---|---|---|---|---|
| 94% TO 98% | "238" TO "255" | PG | ON | OFF | INVERSE MASK 1 | no data | no data | no data | PG |
| 84% TO 90% | "212" TO "232" | G | ON | OFF | INVERSE MASK m | SOLID | no data | no data | G |
| 10% TO 16% | "23" TO "43" | M | ON | OFF | no data | halftone-n | no data | no data | M |
| 0% TO 6% | "1" TO "17" | PM | ON | OFF | no data | no data | no data | SOLID | PM |

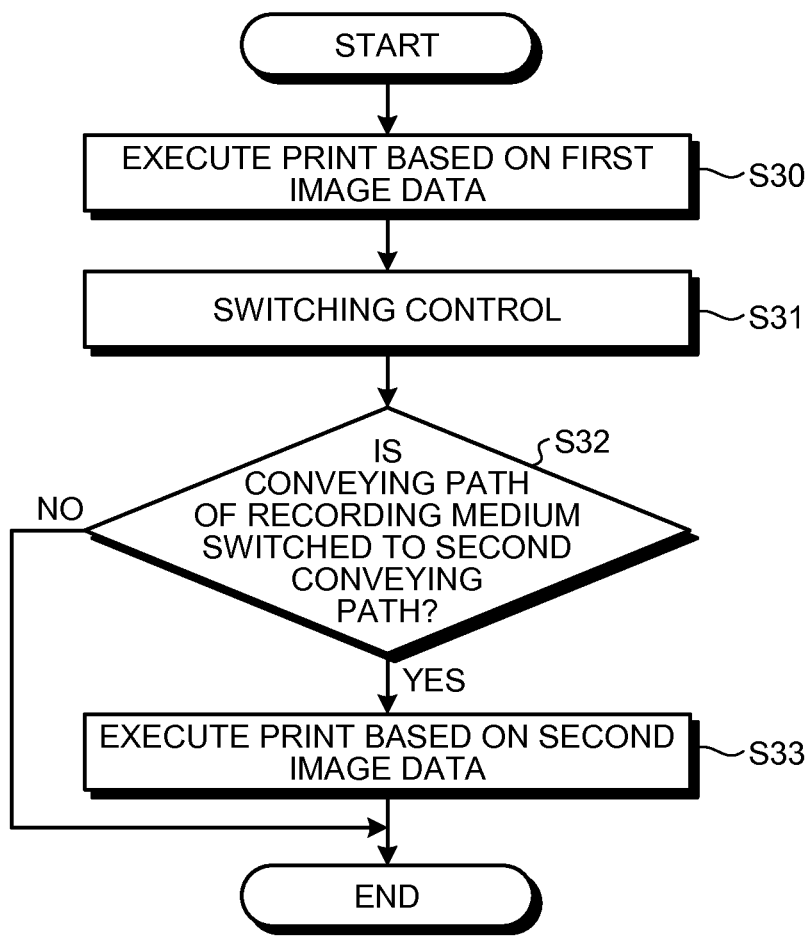

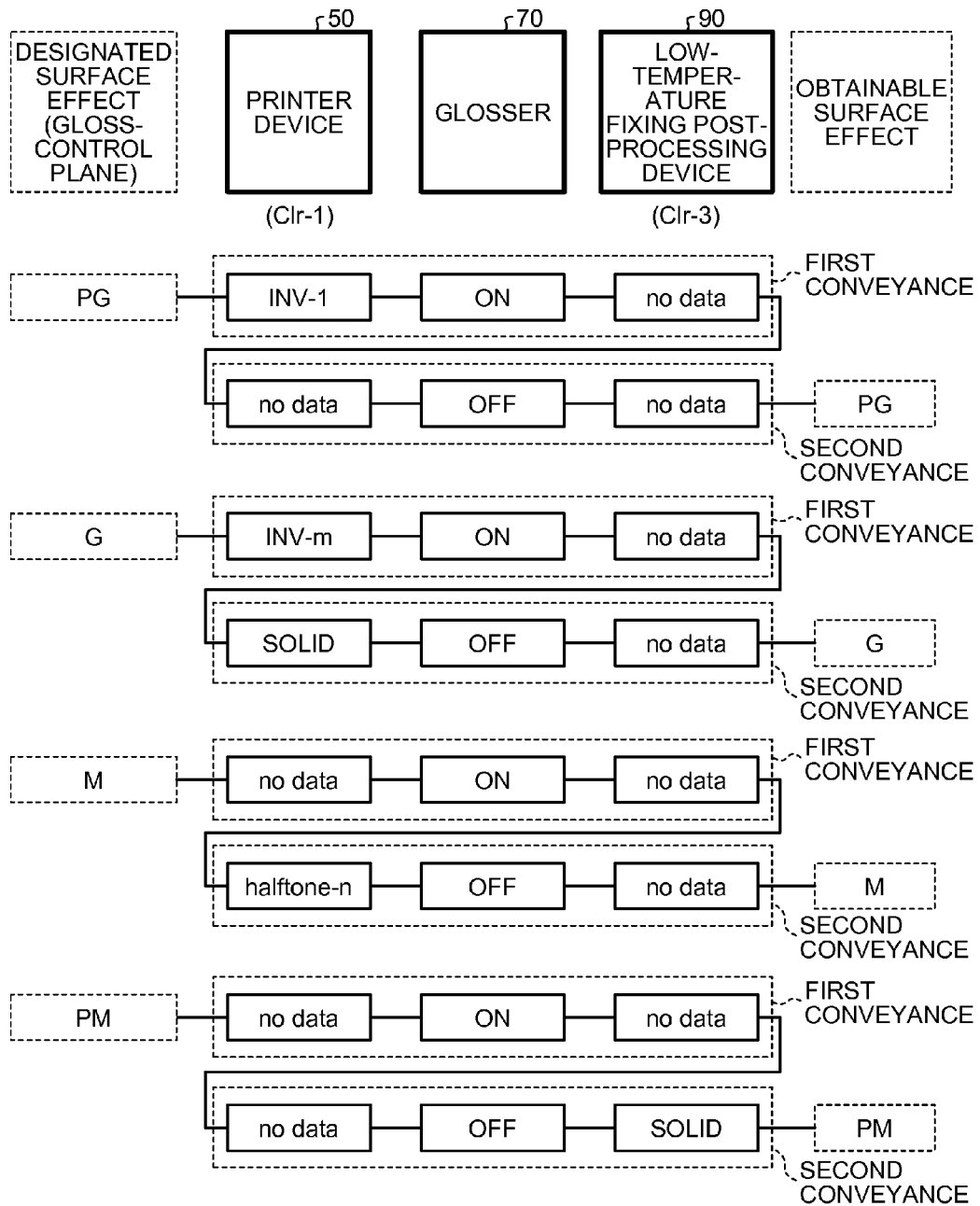

REPLACEMENT TABLE CORRESPONDING TO
TABLE NO. "2" OF FIG. 7

| DENSITY VALUE [%] | DENSITY VALUE | TYPE OF DESIGNATED SURFACE EFFECT | TYPES OF PRACTICABLE SURFACE EFFECTS |
|---|---|---|---|
| 94% TO 98% | "238" TO "255" | PG | PG |
| 84% TO 90% | "212" TO "232" | G | PG |
| 10% TO 16% | "23" TO "43" | M | PM |
| 0% TO 6% | "1" TO "17" | PM | PM |

DISPLAY PROCESSING APPARATUS, IMAGE FORMING SYSTEM, DISPLAY PROCESSING METHOD, AND COMPUTER-READABLE STORAGE MEDIUM

CROSS-REFERENCE TO RELATED APPLICATIONS

The present application claims priority to and incorporates by reference the entire contents of Japanese Patent Application No. 2011-201107 filed in Japan on Sep. 14, 2011 and Japanese Patent Application No. 2012-180281 filed in Japan on Aug. 15, 2012.

BACKGROUND OF THE INVENTION

1. Field of the Invention

The invention relates to a display processing apparatus, an image forming system, a display processing method, and a computer-readable storage medium.

2. Description of the Related Art

Conventionally, there is an image forming apparatus mounted with a clear toner that is a colorless toner containing no color material except CMYK four-color toners. A toner image formed by the clear toner is fixed on a recording medium on which an image is formed by the CMYK toners. As a result, a visual effect and a tactual effect (called surface effect) are realized on a surface of the recording medium. In the image forming apparatus, there is known a technology for executing a preview display to confirm how a print is finished by the clear toner before print. For example, Japanese Patent Application Laid-open No. 2008-145784 discloses a technology for preview displaying a portion of an image that is desired to be printed by a clear toner before print.

However, in the technology disclosed in Japanese Patent Application Laid-open No. 2008-145784, when a designated surface effect cannot be realized by a device configuration of a printer and the like, a difference between an actual print result and a preview display becomes large. That is, a problem arises in that a preview display near to an actual print result cannot be realized depending on a device configuration of a printer.

Therefore, there is a need for a display processing apparatus, an image forming system, a display processing method, and a computer-readable storage medium, capable of realizing a preview display near to an actual print result regardless of a device configuration of a printer.

SUMMARY OF THE INVENTION

It is an object of the present invention to at least partially solve the problems in the conventional technology.

According to an embodiment, there is provided a display processing apparatus that includes a receiving unit configured to receive designation information for designating an area to which a surface effect is applied in image data and a type of the surface effect; a gloss-control plane generating unit configured to generate gloss-control plane data for specifying a type of a surface effect applied to a recording medium and an area in a recording medium to which the surface effect is applied based on the designation information; an obtaining unit configured to obtain replacement information that is information depending on a device configuration of a printing apparatus for forming an image to the recording medium based on the image data, the replacement information being used to replace a type of the surface effect that is not available in the device configuration with a type of the surface effect that is available in the device configuration; a replacing unit configured to replace the type of the surface effect designated by the designation information with the type of the available surface effect using the replacement information obtained by the obtaining unit; a preview image generating unit configured to generate a preview image illustrating an image that estimates a result of print executed by the printing apparatus based on the gloss-control plane data having an area to which the available surface effect is to be applied; and a display unit configured to display the preview image generated by the preview image generating unit.

According to another embodiment, there is provided an image forming system that includes a printing apparatus configured to form an image on a recording medium based on image data; and a display processing apparatus configured to display a preview image illustrating an image that estimates a result of print executed by the printing apparatus. The display processing apparatus includes a receiving unit configured to receive designation information for designating an area to which a surface effect is applied in image data and a type of the surface effect; a gloss-control plane generating unit configured to generate gloss-control plane data for specifying a type of a surface effect applied to a recording medium and an area in a recording medium to which the surface effect is applied based on the designation information; an obtaining unit configured to obtain replacement information that is information depending on a device configuration of the printing apparatus, the replacement information being used to replace a type of the surface effect that is not available in the device configuration with a type of the surface effect that is available in the device configuration; a replacing unit configured to replace the type of the surface effect designated by the designation information with the type of the available surface effect using the replacement information obtained by the obtaining unit; a preview image generating unit configured to generate the preview image based on the gloss-control plane data having an area to which the available surface effect is to be applied; and a display unit configured to display the preview image generated by the preview image generating unit.

According to still another embodiment, there is provided a display processing method that includes receiving designation information for designating an area to which a surface effect is applied in image data and a type of the surface effect; generating gloss-control plane data for specifying a type of a surface effect applied to a recording medium and an area in a recording medium to which the surface effect is applied based on the designation information; obtaining replacement information that is information depending on a device configuration of a printing apparatus for forming an image to the recording medium based on the image data, the replacement information being used to replace a type of the surface effect that is not available in the device configuration with a type of the surface effect that is available in the device configuration; replacing the type of the surface effect designated by the designation information with the type of the available surface effect using the replacement information; generating a preview image illustrating an image that estimates a result of print executed by the printing apparatus based on the gloss-control plane data having an area to which the available surface effect is to be applied; and displaying the generated preview image.

According to still another embodiment, there is provided a non-transitory computer-readable storage medium with an executable program stored thereon, wherein the program instructs a processor to perform the display processing method according to the above embodiment.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a view illustrating an example of a reference table;

FIG. 8 is a view illustrating an example of a surface effect selection table;

FIG. 13 is a view illustrating an example of a surface effect selection table;

FIG. 26 is a view illustrating an example of a reference table;

FIG. 27 is a view illustrating an example of a surface effect selection table;

FIG. 28 is a flowchart illustrating an example of a print control process;

FIG. 29 is a view illustrating a correspondence relation between a designated type of a surface effect, generated clear toner plane image data, glosser on/off information, and a type of a practicable surface effect;

DETAILED DESCRIPTION OF THE PREFERRED EMBODIMENTS

Embodiments of a display processing apparatus, an image forming system, a display processing method, and a computer-readable storage medium according to the invention will be explained below in detail referring to accompanying drawings. In the embodiments described below, although the display processing apparatus according to the invention will be explained exemplifying an example in which the display processing apparatus is applied to a host device, the embodiments are not limited thereto and the display processing apparatus according to the invention can be applied to any optional device. For example, the display processing apparatus according to the invention can be also applied to an image forming apparatus for forming an image on a medium.

First Embodiment

Figure 1:
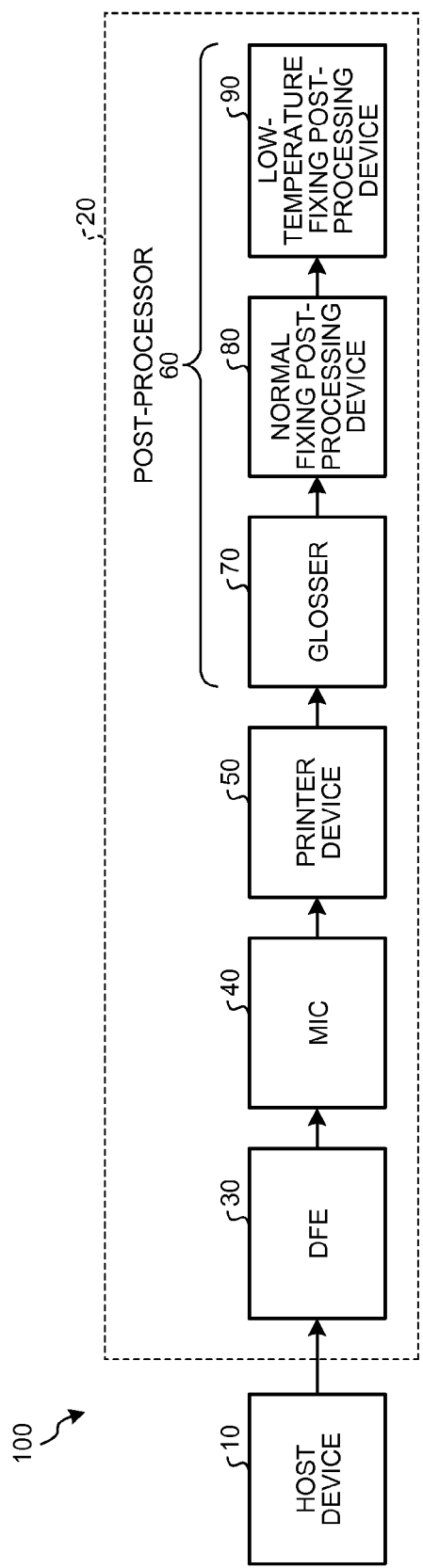
FIG. 1 is a block diagram illustrating an example of a schematic configuration of an image forming system of a first embodiment.

FIG. 1 is a block diagram illustrating of an example of a schematic configuration of an image forming system 100 according to the embodiment. As illustrated in FIG. 1, the image forming system 100 includes a host device 10 and a printing apparatus 20.

Configuration of Printing Apparatus

For the convenience of explanation, first, a specific configuration of the printing apparatus 20 will be explained. The printing apparatus 20 is configured by connecting a digital front end (DFE) 30, a mechanism I/F controller (MIC) 40, a printer device 50, a post-processor 60.

The DFE 30 communicates with the printer device 50 via the MIC 40 and controls image formation in the printer device 50. Further, the DFE 30 is connected with the host device 10 to be described later. The DFE 30 receives print data to be described from the host device 10 and generates image data for forming a toner image according to respective CMYK toners and a colorless (transparent color) clear toner based on the print data. The DFE 30 transmits the generated image data to each of the printer device 50 and the post-processor 60 via the MIC 40.

The printer device 50 is mounted with at least the CMYK toners and the clear toner, and an image forming unit including a photosensitive element, a charger, a developing unit, and a photosensitive element cleaner, and an exposing unit, and the like are mounted to each toner.

The clear toner is a transparent (colorless) toner containing no color material. Note that transparent (colorless) state shows that transmittance is, for example, 70% or more.

The printer device 50 radiates a light beam from the exposing unit according to the image data transmitted from the DFE 30 via the MIC 40, forms toner images according to respective toners on the photosensitive element by, and transfers the toner images onto a paper as a recording medium. The transferred toner images are applied with heat and pressure within a predetermined range of temperature (ordinary temperature) in a not illustrated fixing unit and fixed on the medium. With the operation, an image is formed on the paper. Note that the paper is an example of the recording medium and the recording medium is not limited to the paper. For example, a synthesized paper, a vinyl sheet, and the like can be applied as the recording medium.

In the example of FIG. 1, the post-processor 60 is configured including a glosser 70 connected to the printer device 50, a normal fixing post-processing device 80 connected to the glosser 70, and a low-temperature fixing post-processing device 90 connected to the normal fixing post-processing device 80. The glosser 70 is turned on or off by being controlled by the DFE 30, and when the glosser 70 is turned on, the glosser 70 presses the image formed on the paper by the printer device 50 at high temperature and high pressure and thereafter exfoliates the paper on which the image is formed from the printer device 50 by cooling the image. With the operation, a total adhesion amount of the toners of respective pixels to which toners more than predetermined amounts are adhered is uniformly compressed in an overall image formed on the recording medium. Accordingly, the glosser 70 can increase a glossiness of the toner image by fixing the toner image on the recording medium which is formed by the printer device 50 again and more improving a smoothness of a surface of the toner image on the recording medium.

The normal fixing post-processing device 80 is mounted with a clear toner and a fixing unit for fixing the clear toner and is input with clear toner plane image data to be described later that is generated by the DFE 30. The normal fixing post-processing device 80 forms a toner image by the clear toner overlapping the toner image on the image formed on the paper pressed by the glosser 70 using the input clear toner plane image data. The toner image formed on the recording medium is fixed on the paper by being applied with heat and pressure in the fixing unit at ordinary temperature.

The low-temperature fixing post-processing device 90 is mounted with a clear toner and a fixing unit for fixing the clear toner and is input with a clear toner plane image data to be described later that is generated by the DFE 30. The low-temperature fixing post-processing device 90 forms a toner image by the clear toner overlapping the toner image on the image formed on the recording medium presses by the glosser 70 and the normal fixing post-processing device 80 using the input clear toner plane image data. The toner image formed on the recording medium is fixed on the recording medium by being applied with heat and pressure at a temperature lower than ordinary temperature (low temperature) in the fixing unit.

An outline of image data (document data) input from the host device 10 to the DFE 30 will be explained here. In the host device 10, the image data is generated by a previously installed image processing application and transmitted to the DFE 30. The image processing application can treat special color plane image data with respect to image data in which density values of respective colors (called density values) in respective color planes such as an RGB plane and a CMYK plane are prescribed to respective pixels. The special color plane is image data for adhering special toners and inks of white, gold, silver, and the like in addition to basic colors such as CMYK and RGB and is data for a printer mounted with the special toners and inks. The special color plane may add R to the basic colors of CMYK and may add Y to the basic colors of RGB to improve color repeatability. Ordinarily, the clear toner is treated as one of special colors. In the embodiment, a clear toner as the special color is used to form a surface effect that is a visual effect or a tactual effect to be applied to a transfer paper and to form a transparent image such as a water mark and a texture other than the surface effect on the transfer paper.

Accordingly, the image processing application of the host device 10 generates gloss-control plane image data and/or clear plane image data as the special color plane image data to input image data in addition to the color plane image data in response to a designation of a user.

Figures 2, 3:
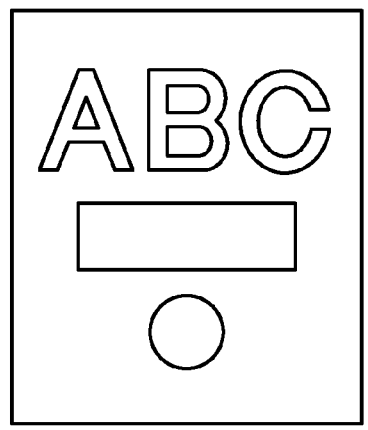
FIG. 2 is a view illustrating an example of color plane image data.
FIG. 3 is a view exemplifying a type of a surface effect relating to a presence or absence of gloss.

The color plane image data is image data in which density values of colors such as RGB and CMYK are prescribed to respective pixels. In the color plane image data, 1 pixel is shown by 8 bits by a color designation by the user. FIG. 2 is an explanatory view illustrating an example of the color plane image data. In FIG. 2, a density value, which corresponds to color designated by the user in image processing application, is applied to each of drawing objects such as "A", "B", "C".

Further, the gloss-control plane image data is image data in which an area to which a surface effect is applied and a type of the surface effect is specified to execute control for adhering a clear toner according to the surface effect that is a visual effect or a tactual effect to be applied to a transfer paper.

The gloss-control plane image data is shown by a density value of 8 bits within a range of 0 to 255 to each pixel likewise the RGB plane and the CMYK plane, and a type of the surface effect is caused to correspond to the density value (the density value may be shown by 16 bits and 32 bits or by 0 to 100%). Further, since the same value is set to a range to which the same surface effect is desired to be applied regardless of a density of a clear toner which is actually adhered, the area can be easily specified from image data when necessary without data which shows the area. That is, a type of the surface effect and a area to which the surface effect is applied are shown by the gloss-control plane image data (data showing the area may be separately applied).

The host device 10 sets a type of the surface effect to a drawing object which the user has designated by the image processing application as a density value as a gloss-control value to each drawing object and generates gloss-control plane image data of a vector form (gloss-control plane data).

Note that any of the color plane image data, the gloss-control plane image data, and the clear plane image data is configured in a page unit.

When largely classified, the type of the surface effect includes a surface effect relating to presence or absence of gloss, a surface protection, a water mark in which information is buried, a texture, and the like. As to a surface effect relating to the presence or absence of gloss, there are four types when largely classified as exemplified in FIG. 3, that is, there are respective types such as Premium Gloss (PG) (mirror-surface glossy), Gloss (G) (solid glossy), Matte (M) (halftone matte), and Premium Matte (PM) (delustered) in a higher order of a glossiness (gloss level). Hereinafter, Premium Gloss may be called "PG", Gloss may be called "G", Matte may be called "M", and Premium Matte may be called "PM."

A high gloss level is applied by Premium Gloss and Gloss, whereas Matte and Premium Matte are used to suppress gloss and, in particular, Premium Matte realizes a glossiness lower than a glossiness of an ordinary recording medium. In FIG. 3, Premium Gloss has a glossiness Gs of 80 or more, Gloss shows glossiness achieved by primary color or secondary color, Matte is achieved by primary color and has a matte of 30%, and Premium Matt has a glossiness of 10 or less. Further, a deviation of glossiness is illustrated by ΔGs and set to 10 or less. As to the respective types of the surface effects, a higher density value is caused to correspond to a surface effect which has a higher degree of application of gloss, and a lower density value is caused to correspond to a surface effect which suppresses gloss. A surface effect such as the water mark and the texture is caused to correspond to an intermediate density value between the above density values. As the water mark, for example, a character and a pattern are used. The texture shows a character and a design and can apply the tactual effect in addition to the visual effect. For example, a pattern of a stained glass can be realized by the clear toner. The surface protection is substituted by Premium Gloss and Gloss. Note that to what area of an image, which is shown by image data of a process target, the surface effect is to be applied, and what type of the surface effect is to be applied to the area are designated by the user via the image processing application. In the host device 10 for executing the image processing application, the gloss-control plane is generated by setting a density value corresponding to a surface effect designated by the user as to pixels that configures an area designated by the user. A correspondence relation between the density value and the type of the surface effect will be described later.

Figure 4:
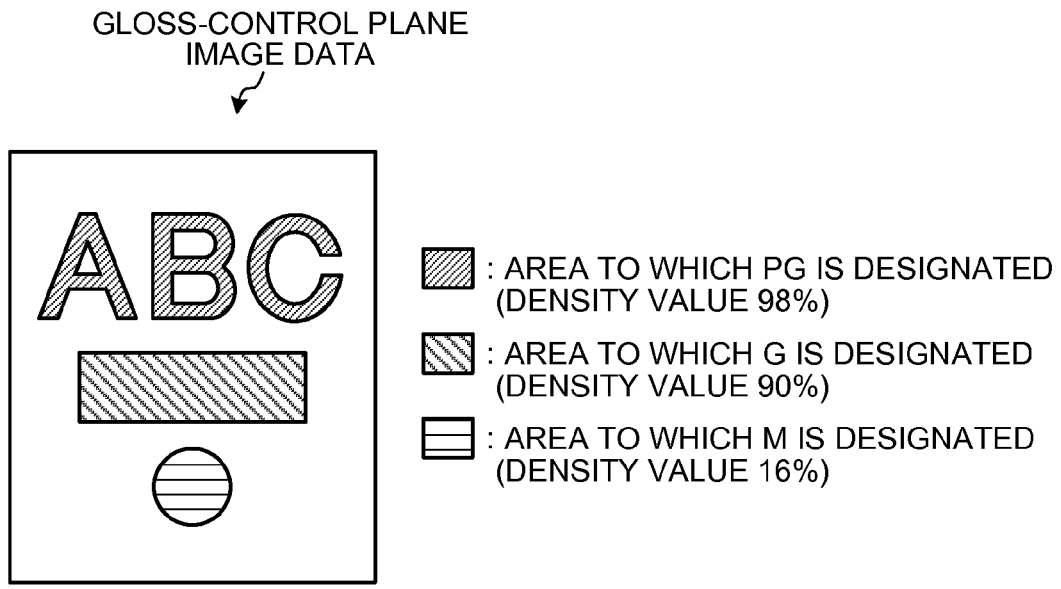
FIG. 4 is a view illustrating gloss-control plane image data as an image.

FIG. 4 is an explanatory view illustrating an example of the gloss-control plane image data. The example of the gloss-control plane of FIG. 4 illustrates an example in which a surface effect "PG (Premium Gloss)" is applied to a drawing object "ABC", a surface effect "G (Gloss)" is applied to a drawing object of rectangular figure, and a surface effect "M (Matte)" is applied to a drawing object of circular figure by the user. Note that density values set to the respective surface effects are density values determined corresponding to a type of the surface effects by a density value selection table to be described later.

Figure 5:
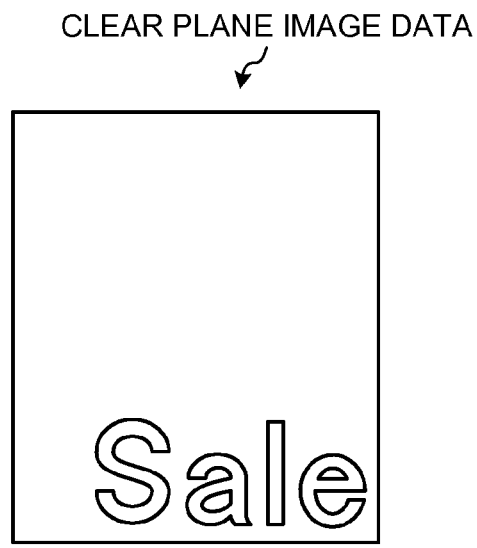
FIG. 5 is a view illustrating an example of clear plane image data.

The clear plane image data is image data in which a transparent image such as a water mark and a texture other than the surface effect is specified. FIG. 5 is an explanatory view illustrating an example of the clear plane image data. In the example of FIG. 5, a water mark "Sale" is designated by the user.

As described above, the gloss-control plane image data and the clear plane image data that are the special color plane image data are generated by a plane different from that of the color plane image data by the image processing application of the host device 10. Further, although Portable Document Format (PDF) is used as a format of respective image data of the color plane image data, the gloss-control plane image data, and the clear plane image data, PDF image data of the respective planes are integrated and generated as document data. Note that the data formats of the image data of the respective planes are not limited to PDF, and any optional format can be used.

The host device 10 outputs print data, which includes document data, in which the color plane image data, the gloss-control plane image data and/or the clear plane image data are integrated, and further includes a job command, to the DFE 30. The job command is an instruction for designating, for example, a setting of a printer, a setting of an aggregation, and a setting of both sides to a printer. Although job definition format (JDF) is used as the job command, the job command is not limited thereto. For example, JDF is a command for designating "single sided print and staple in use" as the setting of the aggregation. Further, the print data may be converted to page description language (PDL) such as PostScript or may be a PDF format as it is when the DFE 30 corresponds thereto. Note that a case in which no transparent image is designated and the clear plane image data is not generated will be explained below as an example.

Figure 6:
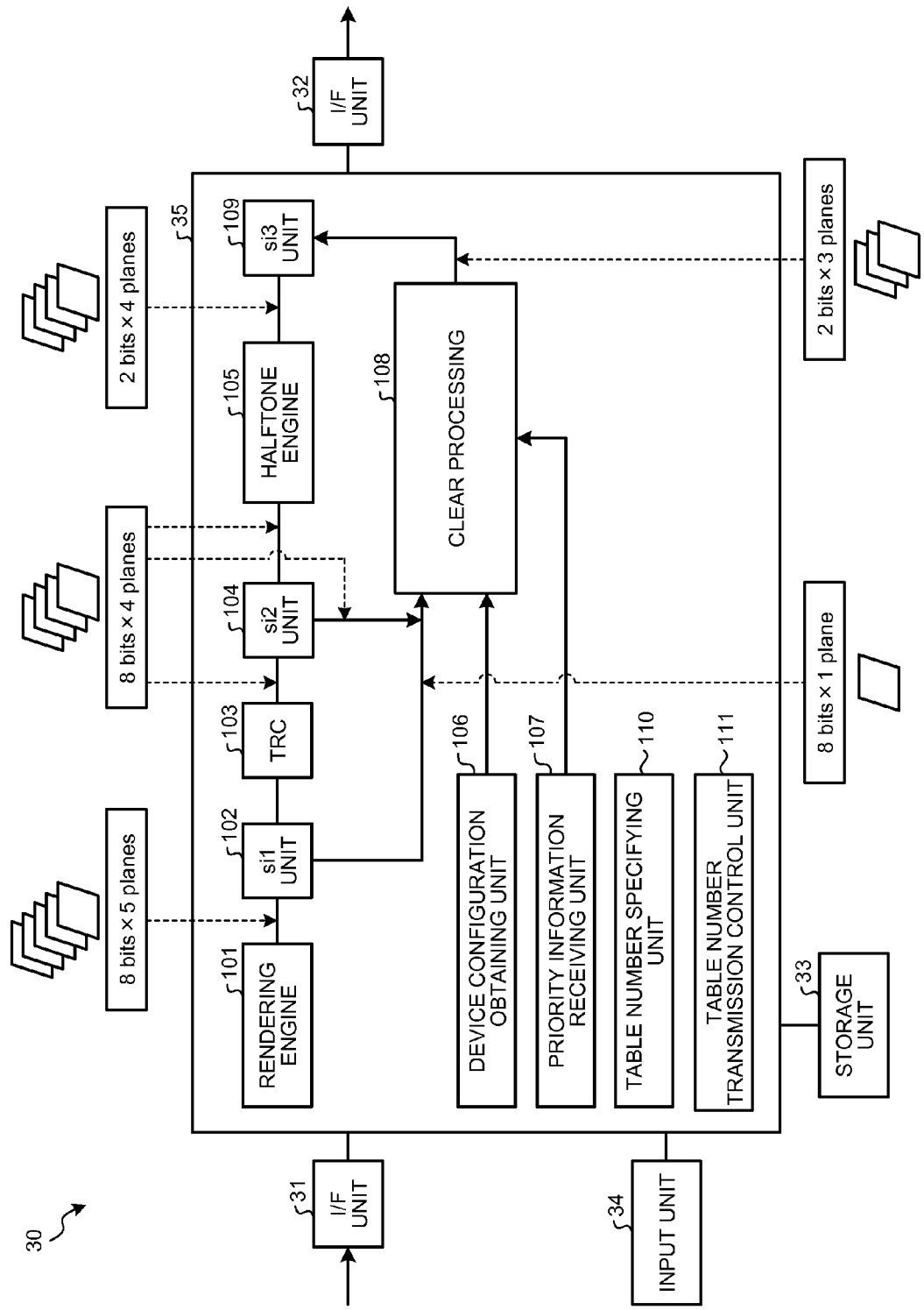
FIG. 6 is a block diagram illustrating an example of a configuration of a DFE of the first embodiment.

Next, a configuration of the DFE 30 will be explained. FIG. 6 is a block diagram illustrating an example of a schematic configuration of the DFE 30. As illustrated in FIG. 6, the DFE 30 is configured including an I/F unit 31, an I/F unit 32, a storage unit 33, an input unit 34, and a control unit 35. The I/F unit 31 is an interface device for making a communication between the I/F unit 31 and the host device 10. The I/F unit 32 is an interface device for making a communication between the I/F unit 32 and the MIC 40. The storage unit 33 is a unit for storing various types of data. The input unit 34 is a unit via which the user executes various types of input operations and can be composed of devices, for example, a key and the like.

The control unit 35 is a unit for controlling the DFE 30 in its entirety and is a computer configured including a CPU, ROM and RAM, and the like. As illustrated in FIG. 6, functions provided with the control unit 35 include a rendering engine 101, an Si1 unit 102, a TRC 103, an Si2 unit 104, a halftone engine 105, a device configuration obtaining unit 106, a priority information receiving unit 107, a clear processing 108, an Si3 unit 109, a table number specifying unit 110, and a table number transmission control unit 111. These functions are realized by developing various programs stored in the ROM and the like on the RAM by the CPU of the control unit 35 and executing the various programs by the CPU. Further, at least a part of these functions can be also realized by individual circuits (hardware). Any of the Si1 unit 102, the Si2 unit 104, and the Si3 unit 109 has an image data separating function and an image data integrating function.

The print data is input to the rendering engine 101 from the host device 10. The rendering engine 101 subjects the input print data to language interpretation and converts a vector format to a raster type, converts a color space expressed by an RGB format to a color space expressed by a CMYK format, and outputs image data of respective CMYK color plane 8-bit image data and 8-bit gloss-control plane image data.

The Si1 unit 102 outputs respective CMYK 8-bit image data to the TRC 103 and outputs 8-bit gloss-control plane image data to the clear processing 108.

The TRC 103 is input with the respective CMYK 8-bit image data via the Si1 unit 102. The TRC 103 executes a gamma correction to the input image data by a one-dimensional lookup table (1D_LUT) gamma curve generated by calibration. As the image processing, there are a toner total amount regulation and the like in addition to the gamma correction. The total amount regulation is a process for restricting respective CMYK 8-bit color plane data after the gamma correction because there is a limit in a toner amount which can be placed in a pixel on the recording medium by the printer device 50. When a print is executed in excess of the total amount regulation, image quality is degraded by a defective transfer and a defective fixing. The embodiment is explained picking up only the gamma correction relating thereto. The Si2 unit 104 outputs the respective CMYK 8-bit image data having been subjected to the gamma correction by the TRC 103 to the clear processing 108 as data for generating an inverse mask. The halftone engine 105 is input with the respective CMYK 8-bit image data having been subjected to the gamma correction via the Si2 unit 104. The halftone engine 105 executes a halftone processing to the respective input CMYK 8-bit image data. With the operation, respective CMYK 2-bit image data are generated, and the respective CMYK 2-bit image data having been subjected to the halftone process are output to the Si3 unit 109. Note that the two bits are an example and the number of bits is not limited thereto.

The device configuration obtaining unit 106 obtains device configuration information that shows a device configuration of the printing apparatus 20. As described above, the printing apparatus 20 of the embodiment is mounted with the glosser 70, the normal fixing post-processing device 80, and the low-temperature fixing post-processing device 90 as the post-processor 60. Although the device configuration information is information showing what is mounted as the post-processor 60, the device configuration information is not limited thereto. In short, the device configuration information may be any information as long as it shows the device configuration of the printing apparatus 20. The device configuration information is obtained by the MIC 40 and input from the MIC 40 to the device configuration obtaining unit 106. The device configuration obtaining unit 106 outputs the obtained device configuration information to the clear processing 108.

The priority information receiving unit 107 receives an input of priority information for designating any of "priority-on-gloss" and "priority-on-type" and outputs the received priority information to the clear processing 108. The priority information is input by the user who operates the input unit 34. The user can input the priority information for designating "priority-on-gloss" and can input the priority information for designating "priority-on-type". Note that "priority-on-gloss" shows to replace the surface effect designated by the user with a surface effect having a higher glossiness. Further, "priority-on-type" shows to replace the surface effect designated by the user with a surface effect that does not include Premium Gloss (PG) having a highest glossiness.

The clear processing 108 determines whether the glosser 70 is turned on or off referring to a surface effect selection table (to be described later) corresponding to the device configuration information and the priority information input thereto and generates 2-bit clear toner plane image data for adhering a clear toner using the input gloss-control plane image data. Specific contents will be explained below.

The storage unit 33 is stored with a reference table for storing a relation between the device configuration information and the priority information, and a table number. FIG. 7 is a view schematically illustrating an example of the reference table. As illustrated in FIG. 7, when, for example, the glosser 70, the normal fixing post-processing device 80, and the low-temperature fixing post-processing device 90 are mounted as the post-processor 60, the table number which corresponds to the device configuration information and the priority information is "1" regardless of whether any of "priority-on-gloss" and "priority-on-type" is designated by the priority information. Further, when, for example, the glosser 70 and the low-temperature fixing post-processing device 90 are mounted as the post-processor 60 and "priority-on-gloss" is designated by the priority information, the table number corresponding to the device configuration information and the priority information is "2". It can be understood here that the table number is information that is specified according to the device configuration information and the priority information.

Further, the storage unit 33 stores plural types of surface effect selection tables that correspond to plural types of table numbers in a 1:1 relationship. The respective surface effect selection tables store a density value of the gloss-control plane image data that is shown in a range of 0% to 98%, a density value of the gloss-control plane image data that is shown 256 steps of 0 to 255, a type of the surface effect designated by the user, on/off information for designating any of on and off of the glosser 70, a determination method of a density value of the clear toner plane image data, and a type of a practicable (available) surface effect by causing them to correspond to each other. FIG. 8 is a view illustrating an example of the surface effect selection tables corresponding to the table number "1". Contents of the respective surface effect selection tables are determined according to the device configuration information and the priority information and different in each table number.

The clear processing 108 specifies a table number corresponding to the device configuration information and the priority information input thereto referring to the reference table illustrated in FIG. 7 and reads a surface effect selection table corresponding to the specified table number from the storage unit 33. For example, since the device configuration information of the embodiment is information showing that the glosser 70, the normal fixing post-processing device 80, and the low-temperature fixing post-processing device 90 are mounted as the post-processor 60, the clear processing 108 specifies "1" as the table number correspond to the device configuration information and the priority information input thereto regardless of whether any of "priority-on-gloss" and "priority-on-type" is designated by the priority information and reads a surface effect selection table that corresponds to the specified table number "1" from the storage unit 33 (refer to FIG. 8).

When a density value of a pixel included in the gloss-control plane image data is 238 to 255 (94% to 98%), an example of FIG. 8 illustrates that a type of the surface effect designated by the user is PG (Premium Gloss), on/off information is "on", a density value of the pixel in first clear toner plane image data Clr-1 used by the printer device 50 is determined by "inverse mask 1" and shown by 8 bits, the pixel in each of second clear toner plane image data Clr-2 used by the normal fixing post-processing device 80 and third clear toner plane image data Clr-3 used by the low-temperature fixing post-processing device 90 has no density value ("no data"), and a type of a practicable (available) surface effect is "PG", corresponding to the density value of the pixel.

The inverse mask is used to make a total adhesion amount, which is a total of CMYK toners and a clear toner on respective pixels that configure a target area to which a surface effect is applied, uniform. Specifically, in CMYK plane image data, all the density values shown by the pixels that configure the target area are added, and image data obtained by subtracting the added value from a predetermined value becomes the inverse mask. For example, the inverse mask 1 described above is shown by the following Expression (1).

$$Clr=100-(C+M+Y+K), \text{where } Clr<0, \text{and } Clr=0 \qquad (1)$$

In Expression (1), Clr, C, M, Y, K show density ratios converted from the density values in the respective pixels as to a clear toner and each of respective toners C, M, Y, K. That is, the total adhesion amount that is obtained by adding a total adhesion amount of the respective toners C, M, Y, K to an adhesion amount of the clear toner is set to 100% by Expression (1) as to all the pixels that configure the target area to which the surface effect is applied. Note that when the total amount of the respective toners C, M, Y, K is 100% or more, the clear toner is not adhered and its density ratio is set to 0%. This is because a portion in which the total amount of the respective toners C, M, Y, K exceeds 100% is smoothened by a fixing process. As described above, irregularities of a surface due to a difference between the total adhesion amounts of the toners are eliminated in the target area by setting the total adhesion amounts on all the pixels that configure the target area to which the surface effect is applied to 100% or more, with a result that a gloss can be generated by a regular reflection of light. However, there is an inverse mask that can be determined by a method other than Expression (1), and the inverse mask may have plural types.

For example, the inverse mask may uniformly adhere a clear toner to the respective pixels. The inverse mask in the case is called also a solid mask and shown by the following Expression (2).

$$Clr=100 \qquad (2)$$

Note that some of the target pixels to which the surface effect is applied may be caused to correspond to a density ratio other than 100%, and the solid mask may have plural patterns.

Further, for example, the inverse mask may be determined by multiplying surface exposing ratios of respective colors. The inverse mask in the case is shown by, for example, the following Expression (3).

$$Clr=100 \times \{(100-C)/100\} \times \{(100-M)/100\} \times \{(100-Y)/100\} \times \{(100-K)/100\} \qquad (3)$$

In Expression (3), $(100-C)/100$ shows a surface exposing ratio of C, $(100-M)/100$ shows a surface exposing ratio of M, $(100-Y)/100$ shows a surface exposing ratio of Y, and $(100-K)/100$ shows a surface exposing ratio of K.

Further, for example, the inverse mask may be determined by a method which assumes that a halftone dot of a maximum area ratio regulates smoothness. The inverse mask in the case is shown by, for example, the following Expression (4).

$$Clr=100-\max(C,M,Y,K) \qquad (4)$$

In Expression (4), $\max(C, M, Y, K)$ shows that a density value of a color showing a maximum density value in CMYK becomes a representative value.

In short, it is sufficient that the inverse mask is shown by any of Expression (1) to Expression (4).

Further, when the density value of a pixel included in the gloss-control plane image data is 212 to 232 (84% to 90%), the example of FIG. 8 illustrates that the type of the surface effect designated by the user is G (Gloss), the on/off information is "on", the density value of the pixel in the first clear toner plane image data Clr-1 is determined by "inverse mask m" and shown by 8 bits, the density value of the pixel in the second clear toner plane image data Clr-2 is determined by "solid" and shown by 2 bits, the pixel in the third clear toner plane image data Clr-3 has no density value ("no data"), and the type of the practicable surface effect is "G", corresponding to the density value of the pixel. Note that the inverse mask m is shown by Expression different from Expression (1) described above (shown by any of Expression (2) to Expression (4)). This is because a total amount of toners that are smoothened is different from the case of PG (Premium Gloss). Further, the solid is used to uniformly adhere a clear toner on the respective pixels that configure the target area to which the surface effect is applied. Specifically, the matte is shown by, for example, Expression (2). Note that some of the target pixels to which the surface effect is applied may be caused to correspond to a density ratio other than 100%, and the solid may have plural patterns.

Further, when the density value of a pixel included in the gloss-control plane image data is 23 to 43 (10% to 16%), the example of FIG. 8 illustrates that the type of the surface effect designated by the user is M (Matte), the on/off information is "on", the density value of the pixel in the first clear toner plane image data Clr-1 is "no data", the density value of the pixel in the second clear toner plane image data Clr-2 is determined by "halftone-n" and shown by 2 bits, the density value of the pixel in the third clear toner plane image data Clr-3 is "no data", and the type of the practicable surface effect is "M", corresponding to the density value of the pixel. Note that the halftone is used to reduce a glossiness by applying a halftone process to a clear toner, applying irregularities on a surface, and diffusedly reflecting light. Plural halftone processes are available and the halftone-n is described as an expression for showing one of the halftone processes. Note that, as described later, in the embodiment, when M (Matte) is designated by the user as a type of the surface effect, a density value of respective pixels in an area in which M is designated in the gloss-control plane image data is commonly set to any value in the range of 23 to 43.

Further, when the density value of a pixel included in the gloss-control plane image data is 1 to 17 (0% to 6%), the example of FIG. 8 illustrates that the type of the surface effect designated by the user is PM (Premium Matte), the on/off information is "on", the density value of the pixel in each of the first clear toner plane image data Clr-1 and the second clear toner plane image data Clr-2 is "no data", the density value of the pixel in the third clear toner plane image data Clr-3 is determined by "solid" and shown by 2 bits, and the type of the practicable surface effect is "PM", corresponding to the density value of the pixel.

In the embodiment, the clear processing 108 determines on or off of the glosser 70 referring to the surface effect selection table of FIG. 8 and generates the first 8-bit clear toner plane image data Clr-1, the second 2-bit clear toner plane image data Clr-2, and the third 2-bit clear toner plane image data Clr-3, respectively using the gloss-control plane image data input thereto. The clear processing 108 executes a halftone process to the first 8-bit clear toner plane image data Clr-1 and converts the first 8-bit clear toner plane image data Clr-1 to the first 2-bit clear toner plane image data Clr-1. The clear processing 108 outputs on/off instruction information for instructing any of on and off of the glosser 70 and the respective 2-bit clear toner plane image data (Clr-1 to Clr-3) to the Si3 unit 109.

The Si3 unit 109 integrates the respective CMYK 2-bit image data having being subjected to the halftone process and the respective 2-bit clear toner plane image data (Clr-1 to Clr-3) generated by the clear processing 108, outputs the integrated image data to the MIC 40, and outputs the on/off instruction information supplied from the clear processing 108 to the MIC 40. In the embodiment, when, for example, PG, G, M, and PM are designated in a page, respectively, seven 2-bit image data (CMYK+Clr-1+Clr-2+Clr-3) and the on/off instruction information for instructing "on" of the glosser 70 are output from the DFE 30 to the MIC 40.

Figure 9:
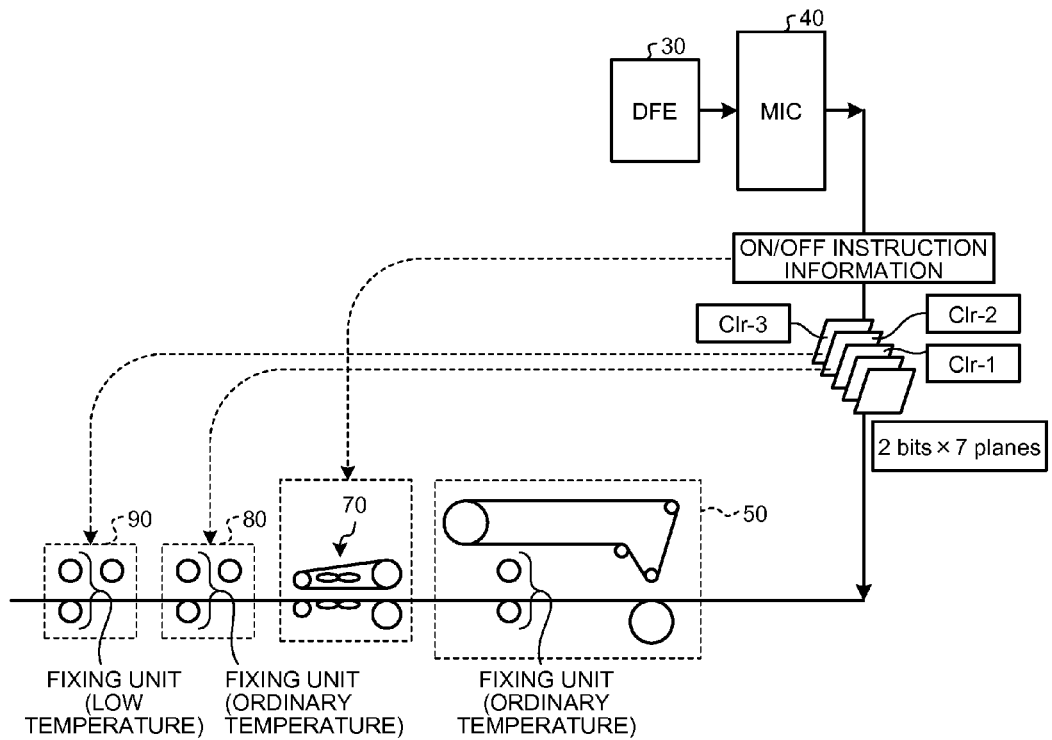
FIG. 9 is a conceptual view illustrating how image data and on/off information are distributed to a printer device and a post-processor.

In the case, as exemplified in FIG. 9, the DFE 30 outputs the CMYK color plane image data and the first clear toner plane image data Clr-1 to the printer device 50 via the MIC 40. Further, the DFE 30 outputs the on/off instruction information for instructing "on" to the glosser 70 via the MIC 40. On receiving the on/off instruction information, the glosser 70 transits to an on-state. Further, the DFE 30 outputs the second clear toner plane image data Clr-2 to the normal fixing post-processing device 80 and output the third clear toner plane image data Clr-3 to the low-temperature fixing post-processing device 90, via the MIC 40.

In an example of FIG. 9, the printer device 50 forms toner images according to respective toners on a photosensitive element using the respective CMYK color plane image data and the first clear toner plane image data Clr-1 output from the MIC 40 and radiating a light beam from the exposing unit and fixes the toner images after the toner images have been transferred onto the recording medium. With the operation, a clear toner is adhered onto the recording medium in addition to the CMYK toners and an image is formed. Thereafter, when the recording medium is conveyed along a conveying path and reaches a position of the glosser 70 in the on-state, the glosser 70 presses the recording medium (an area including an area where the image is formed by the printer device 50) at high temperature and high pressure.

The normal fixing post-processing device 80 forms a toner image by a clear toner using the second clear toner plane image data Clr-2 output from the MIC 40, overlaps the toner image on the recording medium having passed through the glosser 70, and fixes the toner image on the recording medium by heating and pressing the toner image at ordinary temperature. The low-temperature fixing post-processing device 90 forms a toner image by a clear toner using the third clear toner plane image data Clr-3 output from the MIC 40, overlap the toner image on the recording medium having passed through the normal fixing post-processing device 80, and fixes the toner image on the recording medium by heating and pressing the toner image at low temperature.

Figure 10:
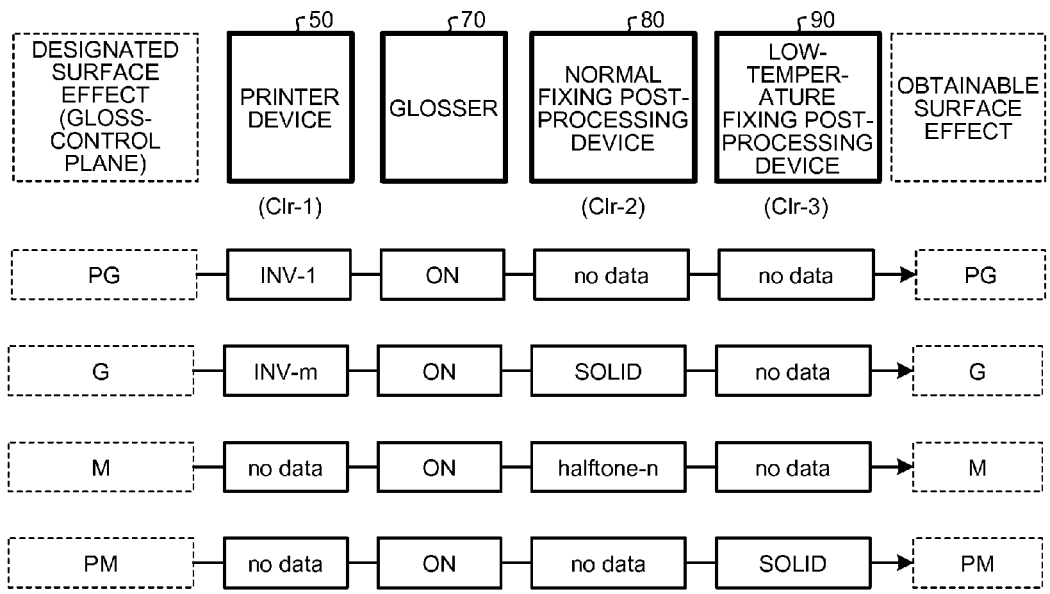
FIG. 10 is a view illustrating a correspondence relation between a designated type of the surface effect, generated clear toner plane image data, glosser on/off information, and a type of a practicable surface effect.

With the operation, as illustrated in FIG. 10, an effect as PG is realized in an area to which PG (Premium Gloss) is designated by the user, and an effect as G is realized in an area to which G (Gloss) is designated by the user. Further, an effect as M is realized in an area to M (Matte) is designated by the user, and an effect as PM is realized in an area to which PM (Premium Matte) is designated by the user. That is, in the device configuration in which the glosser 70, the normal fixing post-processing device 80, and the low-temperature fixing post-processing device 90 are mounted as the post-processor 60, the surface effects of all the four types, i.e., PG (Premium Gloss), G (Gloss), M (Matte), and PM (Premium Matte) can be realized. Note that any of the surface effects is not applied to an area which is not designated as a area to which the surface effect is applied.

The explanation will be continued returning to FIG. 6 again. When the table number specifying unit 110 receives a table number request (to be described later) from the host device 10 via the I/F unit 31, the table number specifying unit 110 refers to the reference table (FIG. 7) stored in the storage unit 33 and specifies a table number corresponding to the device configuration information obtained by the device configuration obtaining unit 106 and to the priority information received by the priority information receiving unit 107. The table number transmission control unit 111 controls the I/F unit 31 so that the I/F unit 31 transmits the table number specified by the table number specifying unit 110 to the host device 10 as a response to the table number request to be described later.

Figure 11:
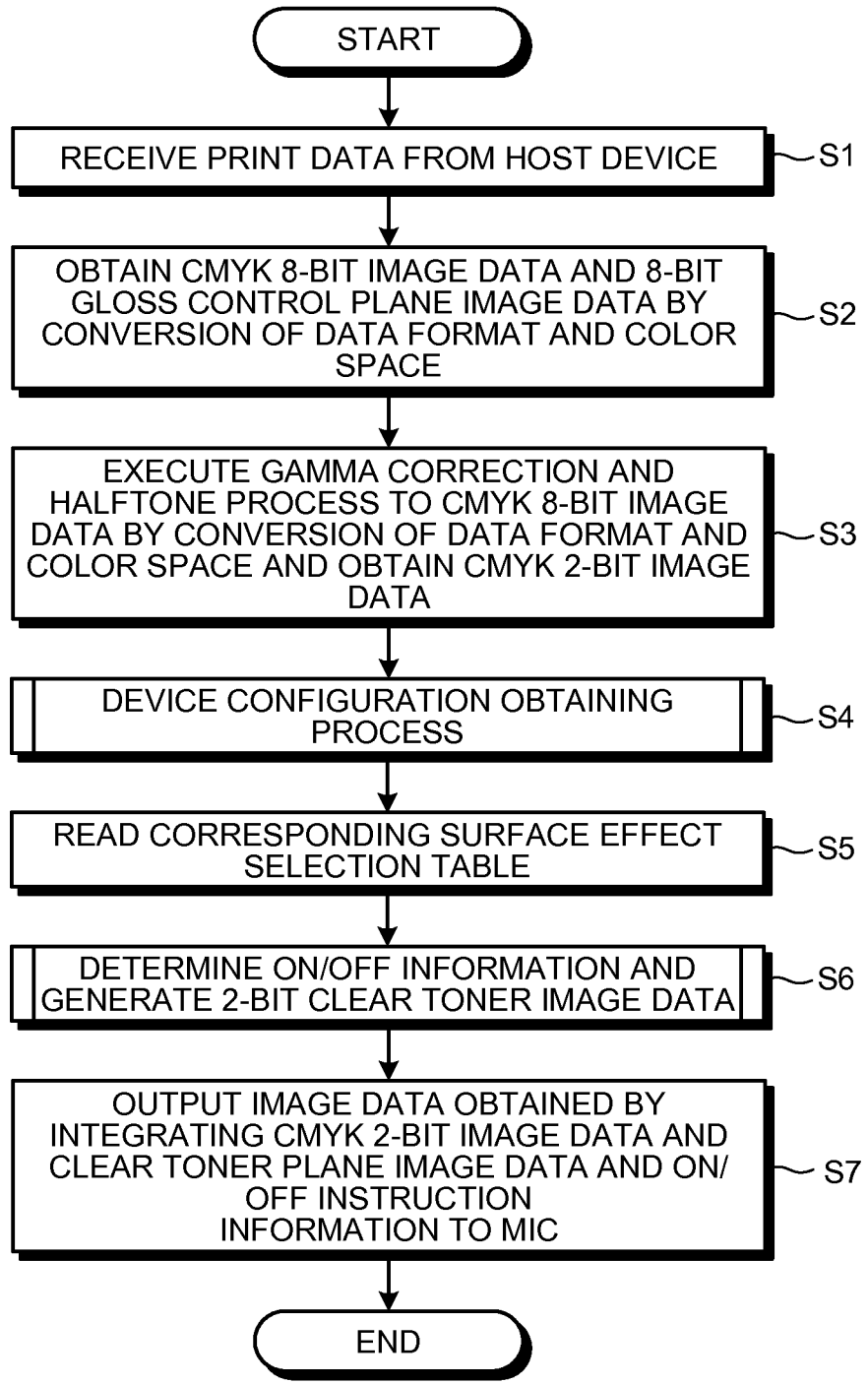
FIG. 11 is a flowchart illustrating an example of a gloss-control process.

Next, a procedure of a gloss-control process executed by the DFE 30 of the embodiment will be explained. FIG. 11 is a flowchart illustrating an example of the gloss-control process. First, when the DFE 30 receives print data to be described later from the host device 10 (step S1), the DFE 30 subjects the received print data to language interpretation and converts a vector format to a raster type, and converts a color space expressed by an RGB format to a color space expressed by a CMYK format, thereby obtaining image data of respective color plane CMYK 8-bit image data and 8-bit gloss-control plane image data (step S2). Next, the DFE 30 executes the gamma correction to the respective CMYK 8-bit color plane image data by the 1D_LUT gamma curve generated by calibration, executes the halftone process to the image data having been subjected to the gamma correction to convert the image data to a data format of the respective CMYK 2-bit image data to be output to the printer device 50, and obtains the respective CMYK 2-bit image data having been subjected to the halftone process (step S3).

Next, the device configuration obtaining unit 106 of the DFE 30 executes a device configuration information obtaining process for obtaining the device configuration information showing the device configuration of the printing apparatus 20 (step S4). The device configuration obtaining unit 106 outputs the obtained device configuration information to the clear processing 108.

Figure 12:
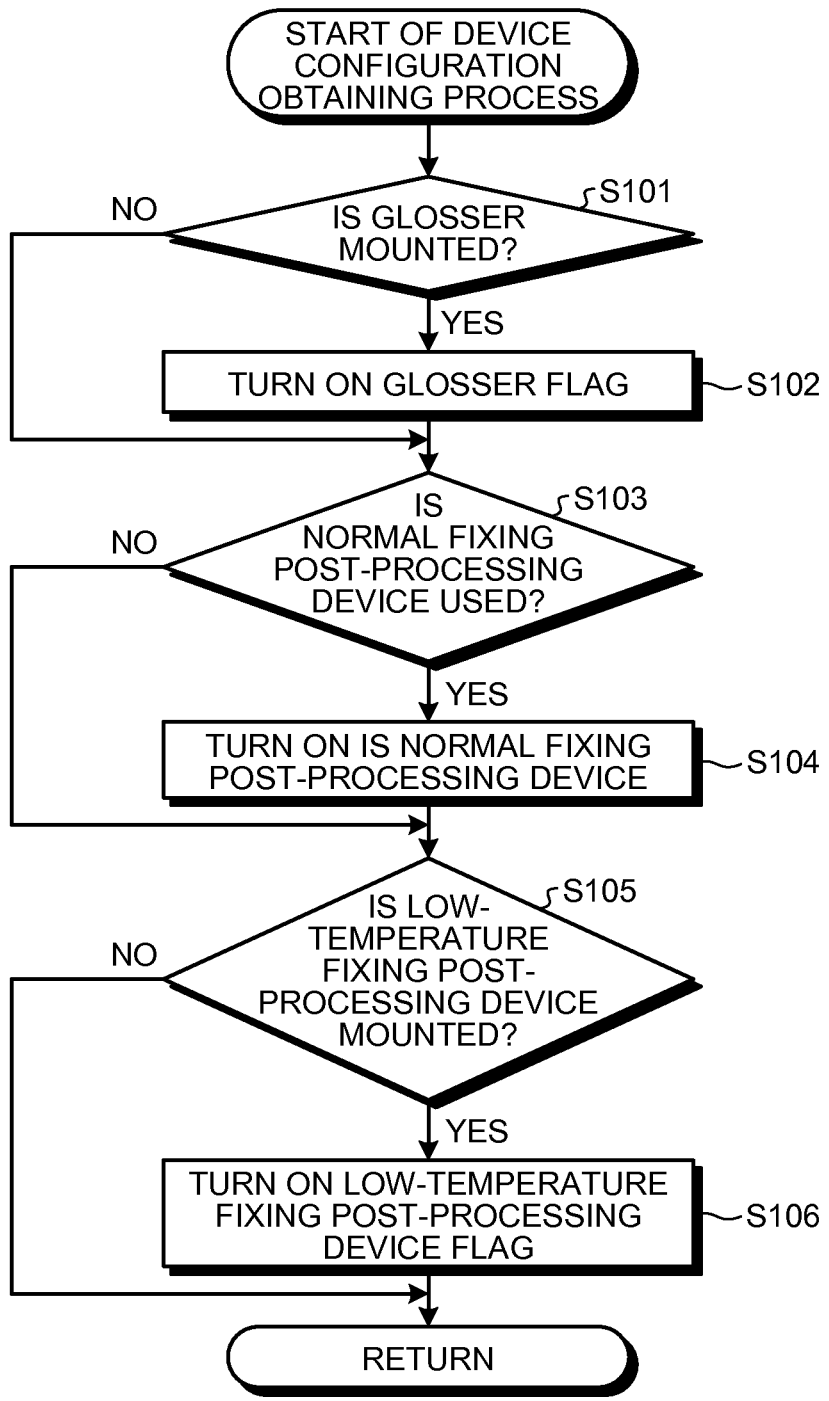
FIG. 12 is a flowchart illustrating an example of a device configuration obtaining process.

FIG. 12 illustrates the device configuration information obtaining process at step S4.

The device configuration obtaining unit 106 outputs a query signal as to whether or not the glosser 70 is mounted on the printing apparatus 20 to the MIC 40. On receiving a signal showing a result of query from the MIC 40, the device configuration obtaining unit 106 discriminates whether or not the glosser 70 is mounted (step S101). When it is discriminated that the glosser 70 is mounted (step S101: Yes), the device configuration obtaining unit 106 turns on a glosser flag showing that the glosser 70 is mounted (step S102).

When it is discriminated that the glosser 70 is not mounted (step S101: No), a process goes to step S103. Further, after the processing at step S102 is executed, the process goes to also step S103. Next, the device configuration obtaining unit 106 outputs a query signal as to whether or not the normal fixing post-processing device 80 is mounted on the printing apparatus 20 to the MIC 40. On receiving a signal showing a result of query from the MIC 40, the device configuration obtaining unit 106 discriminates whether or not the normal fixing post-processing device 80 is mounted (step S103). When it is discriminated that the normal fixing post-processing device 80 is mounted (step S103: Yes), the device configuration obtaining unit 106 turns on a normal fixing post-processing device flag showing that the normal fixing post-processing device 80 is mounted (step S104).

When it is discriminated that the normal fixing post-processing device 80 is not mounted (step S103: No), the process goes to step S105. Further, after the processing at step S104 is executed, the process goes to also step S105. Next, the device configuration obtaining unit 106 outputs a query signal as to whether or not the low-temperature fixing post-processing device 90 is mounted on the printing apparatus 20 to the MIC 40. On receiving a signal showing a result of query from the MIC 40, the device configuration obtaining unit 106 discriminates whether or not the low-temperature fixing post-processing device 90 is mounted (step S105). When it is discriminated that the low-temperature fixing post-processing device 90 is mounted (step S105: Yes), the device configuration obtaining unit 106 turns on a low-temperature fixing post-processing device flag showing that the low-temperature fixing post-processing device 90 is mounted (step S106).

When it is discriminated that the low-temperature fixing post-processing device 90 is not mounted (step S105: No), the routine is finished. Further, after the process at step S106 is executed, the routine is finished.

The explanation will be continued returning to FIG. 11 again. After step S4 described above, the clear processing 108 of the DFE 30 specifies a table number corresponding to the device configuration information and the priority information input thereto referring to the reference table of FIG. 4 and reads a surface effect selection table corresponding to the specified table number from the storage unit 33 (step S5). Next, the clear processing 108 of the DFE 30 determines on/off information referring to the read surface effect selection table and generates the 2-bit clear toner plane image data for adhering the clear toner using the input gloss-control plane image data (step S6). Next, the DFE 30 outputs the respective CMYK 2-bit image data obtained at step 3 and subjected to the halftone process, the 2-bit clear toner plane image data appropriately generated at step S6, and the on/off information determined at step S6 to the MIC 40 (step S7), thereby the gloss-control process is finished.

Incidentally, as described above, when the glosser 70, the normal fixing post-processing device 80, and the low-temperature fixing post-processing device 90 are mounted as the post-processor 60, all the types of PG, G, M, and PM can be realized. When, for example, at least one of the glosser 70, the normal fixing post-processing device 80, and the low-temperature fixing post-processing device 90 is not mounted, however, a surface effect which cannot be realized by the device configuration occurs. In the case, the DFE 30 executes print by replacing a surface effect which cannot be realized by the device configuration with a surface effect which can be realized by the device configuration.

As an example, a case in which the normal fixing post-processing device 80 is not mounted and "priority-on-gloss" is designated is assumed. As can be understood also from FIG. 7, when the glosser 70 and the low-temperature fixing post-processing device 90 are mounted as the post-processor 60 and "priority-on-gloss" is designated by the priority information, a table number which correspond to the device configuration information and the priority information is "2". In the case, the clear processing 108 reads a surface effect selection table corresponding to the table number "2" from the storage unit 33.

FIG. 13 is a view illustrating an example of the surface effect selection table corresponding to the table number "2". The clear processing 108 determines on or off of the glosser 70 referring to the surface effect selection table of FIG. 10 and generates the clear toner plane image data using the input gloss-control plane image data. In the case, since the normal fixing post-processing device 80 is not mounted, the second clear toner plane image data Clr-2 is not generated and the first clear toner plane image data Clr-1 used in the printer device 50 and the third clear toner plane image data Clr-3 used in the low-temperature fixing post-processing device 90 are generated.

When the density value of a pixel included in the gloss-control plane image data is 238 to 255 (94% to 98%), an example of FIG. 13 illustrates that the type of the surface effect designated by the user is PG (Premium Gloss), the on/off information is "on", the density value of the pixel in the first clear toner plane image data Clr-1 is determined by "inverse mask 1" and shown by 8 bits, the pixel in the third clear toner plane image data Clr-3 has no density value ("no data"), and a type of a realized surface effect is "PG", corresponding to the density value of the pixel.

When the density value of a pixel included in the gloss-control plane image data is 212 to 232 (84% to 90%), the example of FIG. 13 illustrates that the type of the surface effect designated by the user is G (Gloss), the on/off information is "on", the density value of the pixel in the first clear toner plane image data Clr-1 is determined by "inverse mask m" and shown by 8 bits, the pixel in the third clear toner plane image data Clr-3 has no density value ("no data"), and the type of the realized surface effect is "PG", corresponding to the density value of the pixel.

When the density value of a pixel included in the gloss-control plane image data is 23 to 43 (10% to 16%), the example of FIG. 13 illustrates that the type of the surface effect designated by the user is M (Matte), the on/off information is "on", the density value of the pixel in the first clear toner plane image data Clr-1 is "no data", the density value of the pixel in the third clear toner plane image data Clr-3 is determined by "solid" and shown by 2 bits, and the type of the realized surface effect is "PM", corresponding to the density value of the pixel.

Further, when the density value of a pixel included in the gloss-control plane image data is 1 to 17 (0% to 6%), the example of FIG. 13 illustrates that the type of the surface effect designated by the user is PM (Premium Matte), the on/off information is "on", the density value of the pixel in the first clear toner plane image data Clr-1 is "no data", the density value of the pixel in the third clear toner plane image data Clr-3 is determined by "solid" and shown by 2 bits, and the type of the realized surface effect is "PM", corresponding to the density value of the pixel.

The clear processing 108 determines on or off of the glosser 70 (in the case, on) referring to the surface effect selection table of FIG. 13 and generates the first 8-bit clear toner plane image data Clr-1 and the third 2-bit clear toner plane image data Clr-3 using the input gloss-control plane image data. The clear processing 108 executes the halftone process to the first 8-bit clear toner plane image data Clr-1 and converts the first 8-bit clear toner plane image data Clr-1 to the first 2-bit clear toner plane image data Clr-1. The DFE 30 integrates the CMYK 2-bit image data having been subjected to the halftone process and the respective 2-bit clear toner plane image data (Clr-1, Clr-3) generated by the clear processing 108 and outputs the integrated image data and the on/off instruction information to the MIC 40.

Figure 14:
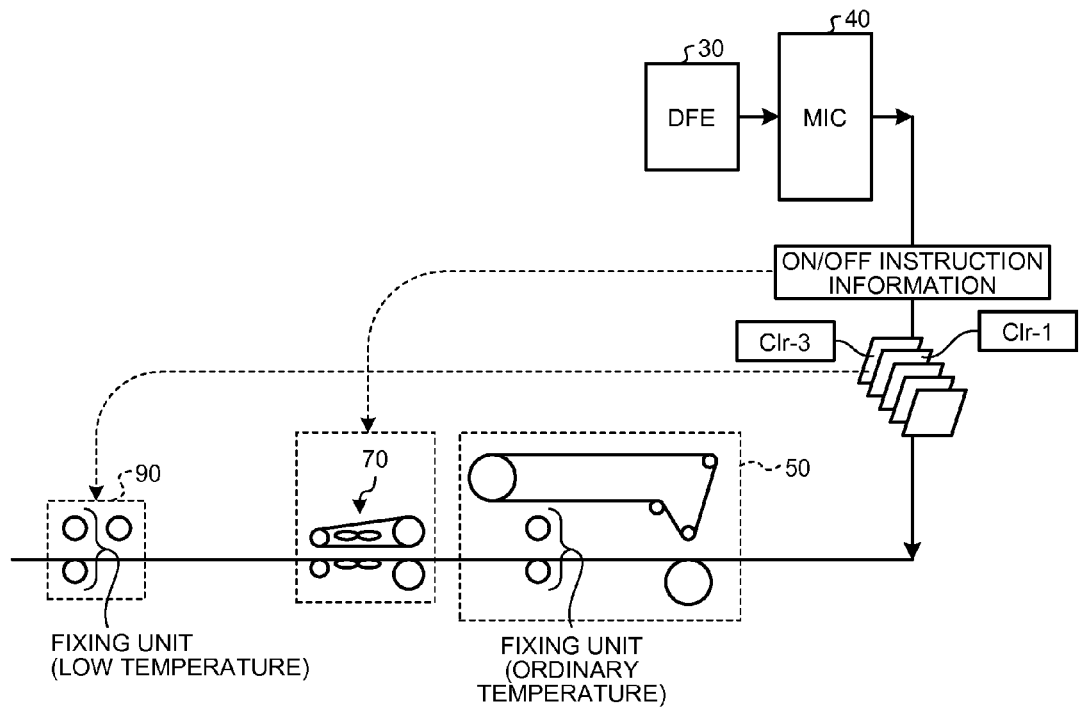
FIG. 14 is a conceptual view illustrating how image data and on/off information are distributed to a printer device and a post-processor.

When, for example, PG, G, M, and PM are designated in a page, respectively, the respective six 2-bits image data (CMYK+Clr-1+Clr-3) and the on/off instruction information for instructing on of the glosser 70 are output from the DFE 30 to the MIC 40. In the case, as exemplified in FIG. 14, the DFE 30 outputs the CMYK color plane image data and the first clear toner plane image data Clr-1 to the printer device 50 via the MIC 40. Further, the DFE 30 outputs the on/off information to the glosser 70 via the MIC 40. On receiving the on/off information, the glosser 70 transits to the on-state. Further, the DFE 30 outputs the third clear toner plane image data Clr-3 to the low-temperature fixing post-processing device 90 via the MIC 40. The printer device 50 forms toner images according to the respective toners on the photosensitive element using the CMYK color plane image data and the first clear toner plane image data Clr-1 output from the MIC 40 and radiating a light beam from the exposing unit and fixes the toner images after the toner images have been transferred onto the recording medium. With the operation, a clear toner is adhered onto the recording medium in addition to the CMYK toners and an image is formed. Thereafter, when the recording medium is conveyed along the conveying path and reaches the position of the glosser 70 in the on-state, the glosser 70 presses the recording medium (an area including an area where the image is formed by the printer device 50) at high temperature and high pressure.

The low-temperature fixing post-processing device 90 forms a toner image by a clear toner using the third clear toner plane image data Clr-3 output from the MIC 40, overlaps the toner image on the recording medium having passed through the glosser 70, and fixes the toner image on the recording medium by heating and pressing the toner image at low temperature.

Figure 15:
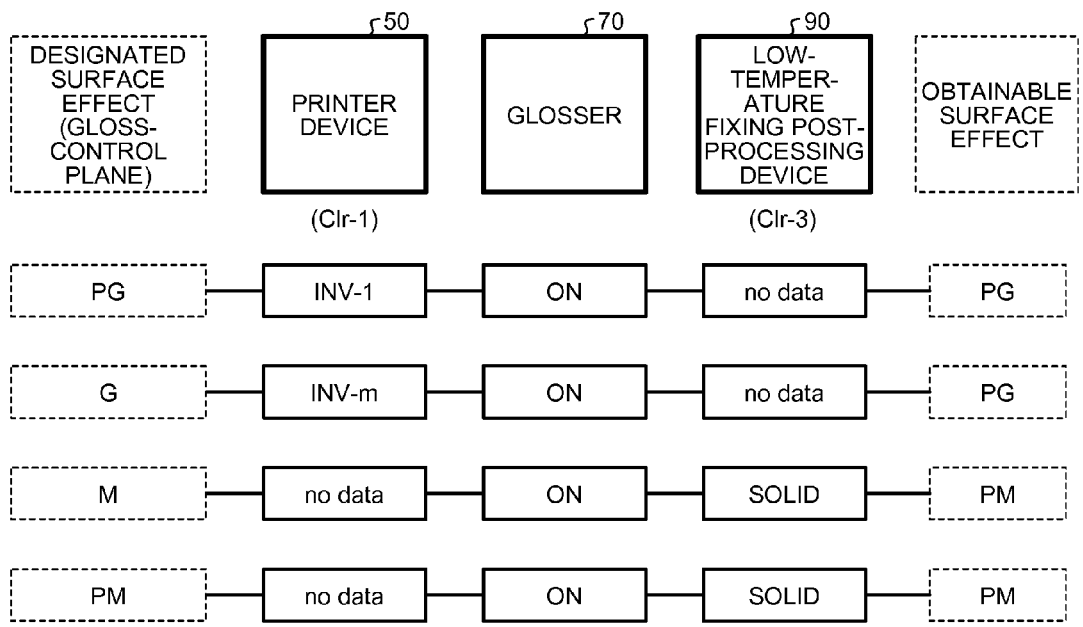
FIG. 15 is a view illustrating a correspondence relation between a designated type of the surface effect, generated clear toner plane image data, glosser on/off information, and a type of practicable surface effect.

With the operation, as illustrated in FIG. 15, a surface effect as PG is realized in an area to which PG (Premium Gloss) is designated by the user, and an effect as PG is realized in an area to which G (Gloss) is designated by the user. That is, the surface effect G which cannot be realized by the device configuration of the printing apparatus 20 is replaced with the surface effect PG which can be realized by the device configuration. Further, an effect as PM is realized in an area to which M (Matte) is designated by the user, and an effect as PM is realized in an area to which PM (Premium Matte) is designated by the user. That is, the surface effect M which cannot be realized by the device configuration of the printing apparatus 20 is replaced with the surface effect PM which can be realized by the device configuration.

Configuration of Host Device

Figure 16:
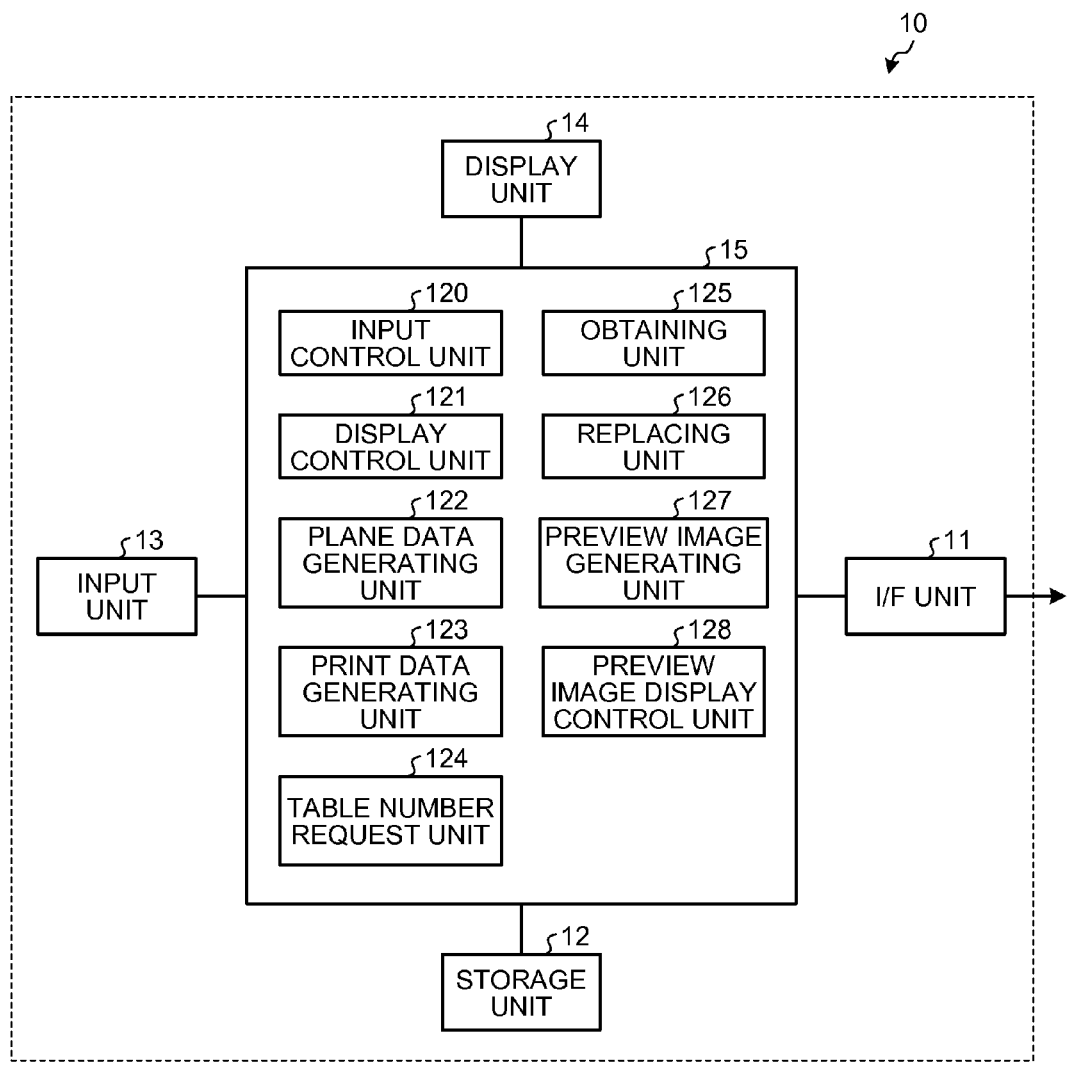
FIG. 16 is a block diagram illustrating an example a configuration of a host device.

Next, a configuration of the host device 10 will be explained. FIG. 16 is a block diagram illustrating an example of a schematic configuration of the host device 10. As illustrated in FIG. 16, the host device 10 is configured including an I/F unit 11, a storage unit 12, an input unit 13, a display unit 14, and a control unit 15. The I/F unit 11 is an interface device for making a communication between the I/F unit 11 and the DFE 30. The storage unit 12 is a unit for storing various types of data. The input unit 13 is a unit via which the user executes various types of input operations and can be composed of devices, for example, a keyboard and a mouse. The display unit 14 is a unit for displaying various types of screens and can be is composed of, for example, a liquid crystal panel and the like.

The control unit 15 is a unit for controlling the host device in its entirety and is a computer configured including a CPU, ROM and RAM, and the like. As illustrated in FIG. 6, functions provided with the control unit 15 includes an input control unit 120, a display control unit 121, a plane data generating unit 122, a print data generating unit 123, a table number requesting unit 124, an obtaining unit 125, a replacing unit 126, a preview image generating unit 127, and a preview image display control unit 128. These functions are realized by developing various programs stored in the ROM and the like on the RAM by the CPU of the control unit 15 and executing the various programs by the CPU. Further, at least a part of these functions can be also realized by an individual circuit (hardware).

The input control unit (receiving unit) 120 receives various inputs from the input unit 13 and controls the inputs. For example, the user can input image designation information for designating an image to which a surface effect is to be applied in various images (for example, a photograph, a character, a figure or an image obtained by synthesizing them), that is, color plane image data (hereinafter, may be called "target image") stored in the storage unit 12 by operating the input unit 13. Note that an input method of the image designation information is not limited to the above method and any optional input method may be employed. The display control unit 121 controls a display of various information to the display unit 14. In the embodiment, when the input control unit 120 receives the image designation information, the display control unit 121 reads an image designated by the image designation information from the storage unit 12 and controls the display unit 14 so that the read image as illustrated in FIG. 2 is displayed on a screen.

The user can input designation information for designating an area to which a surface effect is applied and a type of the surface effect by operating the input unit 13 while confirming a target image displayed on the display unit 14. Note that an input method of the designation information is not limited to the above method and is optional.

Figure 17:
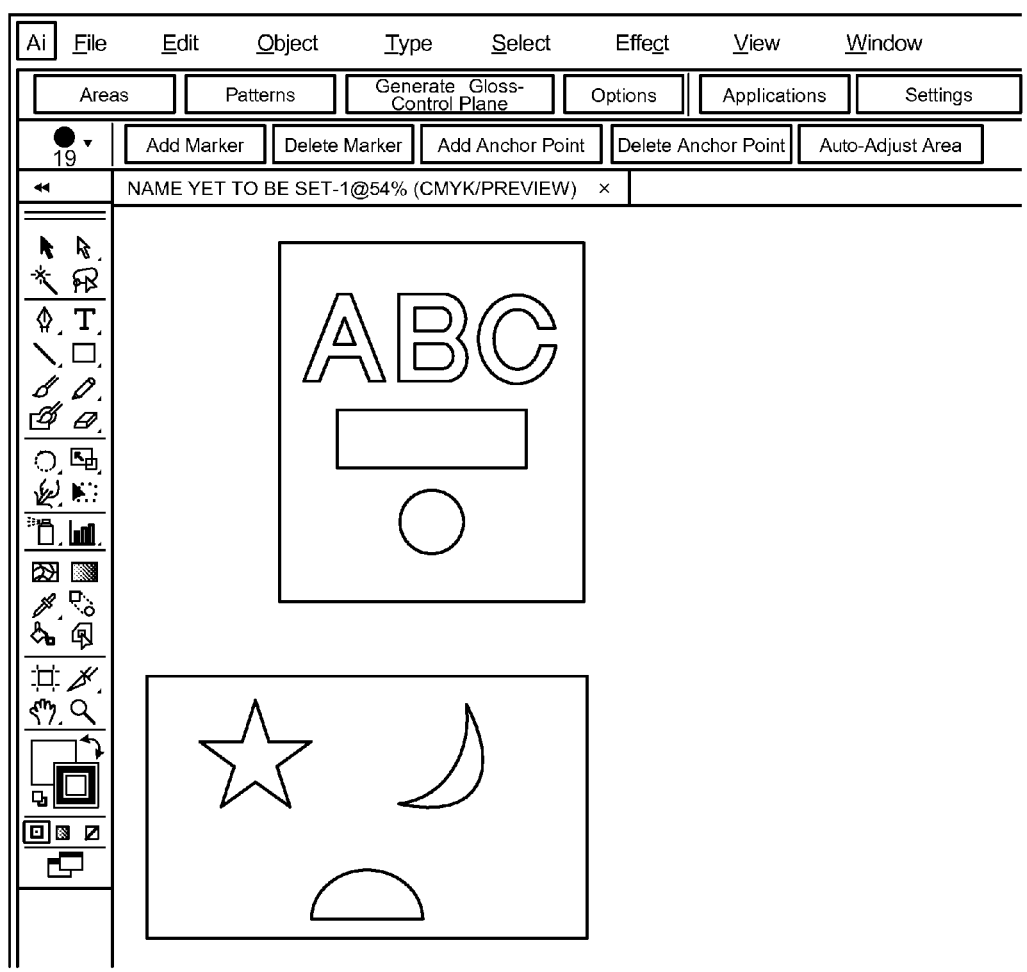
FIG. 17 is a view illustrating an example of a screen displayed by an image processing application.
Figure 18:
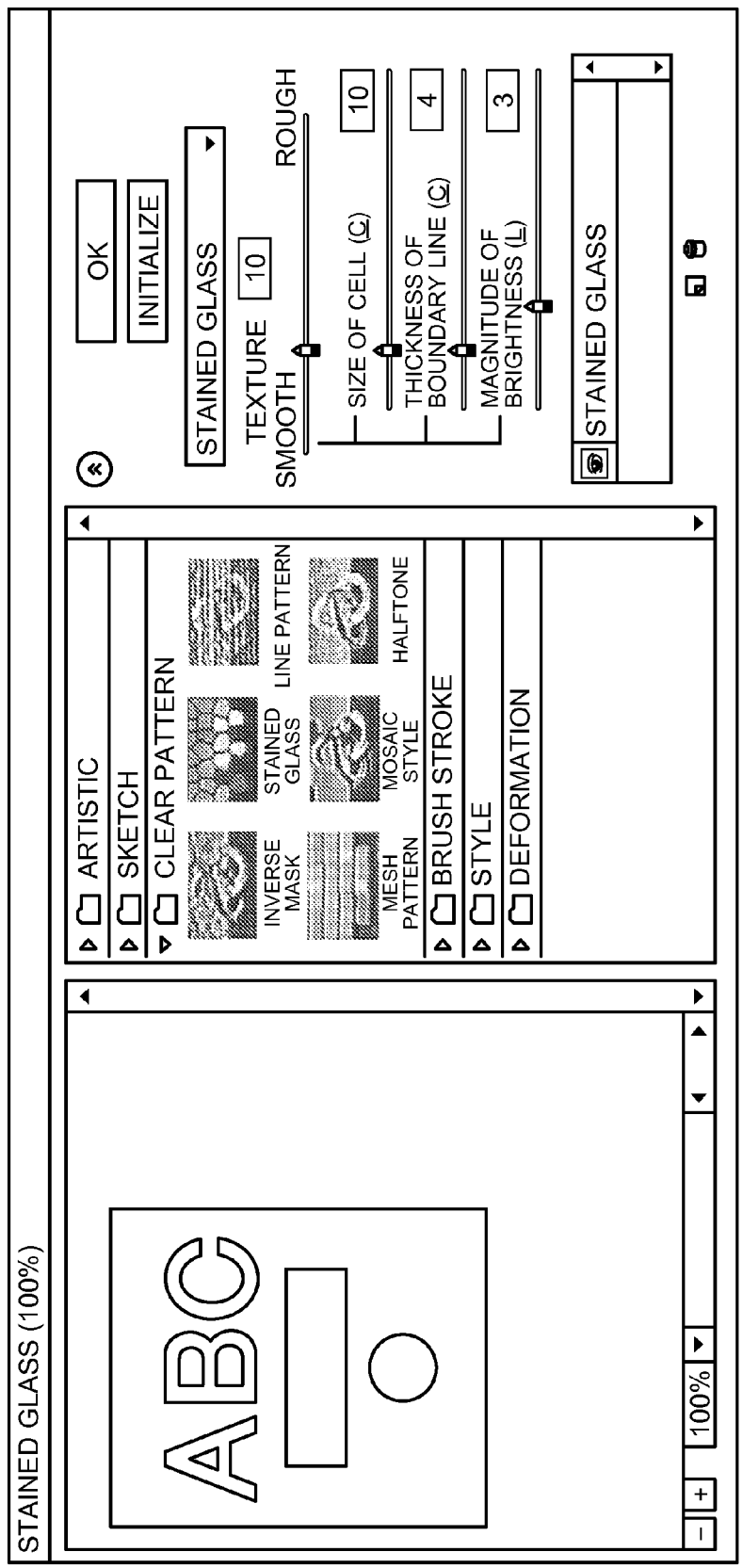
FIG. 18 is a view illustrating an example of a screen displayed by the image processing application.

More specifically, the display control unit 121 causes the display unit 14 to display a screen exemplified in, for example, FIG. 17. FIG. 17 is an example of a screen which is displayed when a plug-in is assembled to Illustrator® marketed by Adobe System Inc. In the screen illustrated in FIG. 17, an image shown by target image data (color plane image data) which is a process target is displayed, and an area to which a surface effect is applied is designated by the user who executes an input operation for designating an area to which the user desires to apply the surface effect by depressing a marker adding button via the input unit 13. The user executes the input operation to all the areas to which a surface effect is applied. The display control unit 121 of the host device 10 causes the display unit 14 to display a screen exemplified in FIG. 18 to, for example, each of designated areas. In the screen illustrated in FIG. 18, each of the areas, which are designated as an area to which the surface effect is applied, displays an image of the area, and a type of a surface effect applied to the area is designated by executing an input operation for designating a type of the surface effect which is desired to be applied to the image via the input unit 13. As the type of the surface effect, Premium Gloss and Gloss of FIG. 3 are illustrated as "inverse mask" in FIG. 18, and the other effects excluding Premium Gloss and Gloss of FIG. 3 are illustrated as stained glass, a line screen pattern, a halftone pattern, and a mosaic style, and Matte and a halftone of FIG. 18, and it is illustrated that the respective surface effects can be designated.

Returning to FIG. 16, the plane data generating unit 122 generates the color plane image data, the gloss-control plane image data, and the clear plane image data, respectively. That is, when the input control unit 120 receives a color which the user designates to a drawing object of the target image, the plane data generating unit 122 generates the color plane image data according to the color designation.

Further, when the input control unit 120 receives a designation of a transparent image such as a water mark and a texture other than a surface effect and an area to which the transparent image is applied, the plane data generating unit 122 generates clear plane data for specifying the transparent image and an area in a transfer paper to which the transparent image is applied according to the designation from the user.

Further, when the input control unit 120 receives designation information (an area to which a surface effect is applied and a type of the surface effect), the plane data generating unit 122 generates the gloss-control plane image data that can specify an area to which the surface effect is applied in the transfer paper and a type of the surface effect based on the designation information. The plane data generating unit 122 generates the gloss-control plane image data in which the area, to which a surface effect shown by a gloss-control value is applied, is designated by a unit of the drawing object of image data of the target image.

Figures 19, 20:
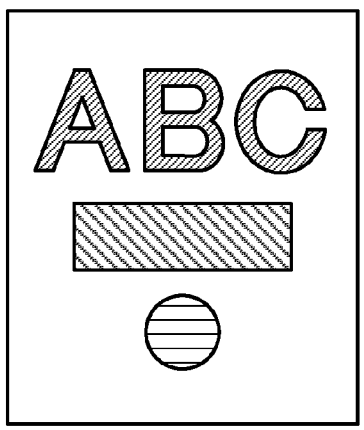
FIG. 19 is a view illustrating an example of a density value selection table.
FIG. 20 is a view illustrating an example of gloss-control plane image data generated by the host device.

The storage unit 12 is stored with a density value selection table for storing the type of the surface effect designated by the user and a density value of a gloss-control plane corresponding to the type of the surface effect. FIG. 19 is a view illustrating an example of the density value selection table. In the example of FIG. 19, a density value of the gloss-control plane corresponding to an area to which "PG" is designated by the user is "98%", a density value of the gloss-control plane corresponding to an area to which "G" is designated is "90%", a density value of the gloss-control plane corresponding to an area to which "M" is designated is "16%", and a density value of the gloss-control plane corresponding to an area to which "PM" is designated is "6%". Further, the storage unit 12 stores plural types of the surface effect selection tables (plural types of the surface effect selection tables corresponding to plural types of table numbers by 1:1) described above. That is, in the embodiment, the plural types of the surface effect selection tables described above are mounted on each of the DFE 30 and the host device 10.

The plane data generating unit 122 sets a density value (gloss-control value) of the drawing object to which a predetermined surface effect is designated by the user to a value according to a type of the surface effect referring to a density value selection table illustrated in FIG. 19, thereby generating the gloss-control plane image data. For example, a case is assumed in which it is designated by the user to apply "PG" to an area shown as "ABC" in the target image of FIG. 2, to apply "G" to a rectangular area, and to apply "M" to a circular area. In the case, the plane data generating unit 122 sets a density value of the area ("ABC") to which "PG" is designated by the user to "98%", sets a density value of the area ("rectangular") to which "G" is designated to "90%", and sets a density value of the area ("circular") to which "M" is designated to "16%", thereby generating the gloss-control plane image data as illustrated in FIG. 20. The gloss-control plane image data generated by the plane data generating unit 122 is image data of a vector format expressed as a parameter of an equation of a coordinate of dots, a line connecting the dots, and a plane, and as a set of drawing information such as a filling and a special effect. In the embodiment, although the PDF format is used as a format of the gloss-control plane image data generated by the plane data generating unit 122, the format of the gloss-control plane image data is not limited to the PDF format, and the format of the gloss-control plane image data is option. The plane data generating unit 122 generates document data by integrating the gloss-control plane image data, the image data of the target image (the color plane image data), and the clear plane image data and delivers the generated document data to the print data generating unit 123.

Figure 21:
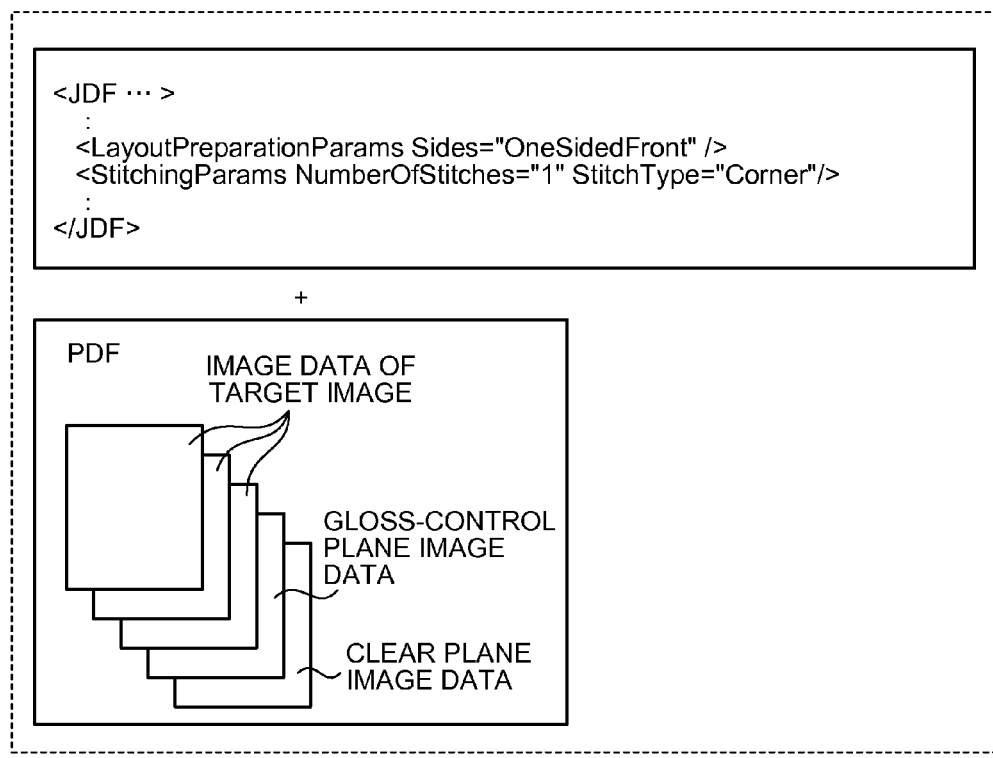
FIG. 21 is a schematic view conceptually illustrating a configuration of print data.

The print data generating unit 123 generates print data based on the document data. The print data is configured including the gloss-control plane image data, the image data of the target image, the clear plane image data, and a job command for designating, for example, a setting of a printer, a setting of an aggregation, and a setting of both sides to a printer. FIG. 21 is a schematic view conceptually illustrating an example of a configuration of the print data. In the example of FIG. 1, although JDF is used as the job command, the job command is not limited thereto. The JDF illustrated in FIG. 21 is a command for designating "single sided print and staple in use" as the setting of the aggregation. Further, the print data may be converted to PDL such as PostScript or may be the PDF format as it is when the DFE 30 corresponds thereto.

The table number requesting unit 124 controls the I/F unit 11 so that a table number request for requesting to obtain a table number is transmitted to the DFE 30. The obtaining unit 125 obtains a table number from the DFE 30 as a response the table number request.

The replacing unit 126 reads a surface effect selection table corresponding to the table number obtained by the obtaining unit 125 from the storage unit 12. The replacing unit 126 replaces the type of the surface effect designated by the user in the gloss-control plane image data generated by the plane data generating unit 122 or in the gloss-control plane image data included in the print data with a type of a practicable surface effect referring to the read surface effect selection table. When, for example, the table number obtained by the obtaining unit 125 is "2", a surface effect selection table corresponding to the table number 2 is a surface effect selection table illustrated in FIG. 10. In the case, the surface effect "G" designated by the user is replaced with a practicable surface effect "PG", and the surface effect "M" designated by the user is replaced with a practicable the surface effect "PM".

The preview image generating unit 127 generates a preview image showing an image in which a result of print executed by the printing apparatus 20 is estimated based on the gloss-control plane image data to which the replacement is executed by the replacing unit 126 and on the image data of the target image (the color plane image data). The preview image display control unit 128 controls the display unit 14 so that the preview image generated by the preview image generating unit 127 is displayed thereon.

Figure 22:
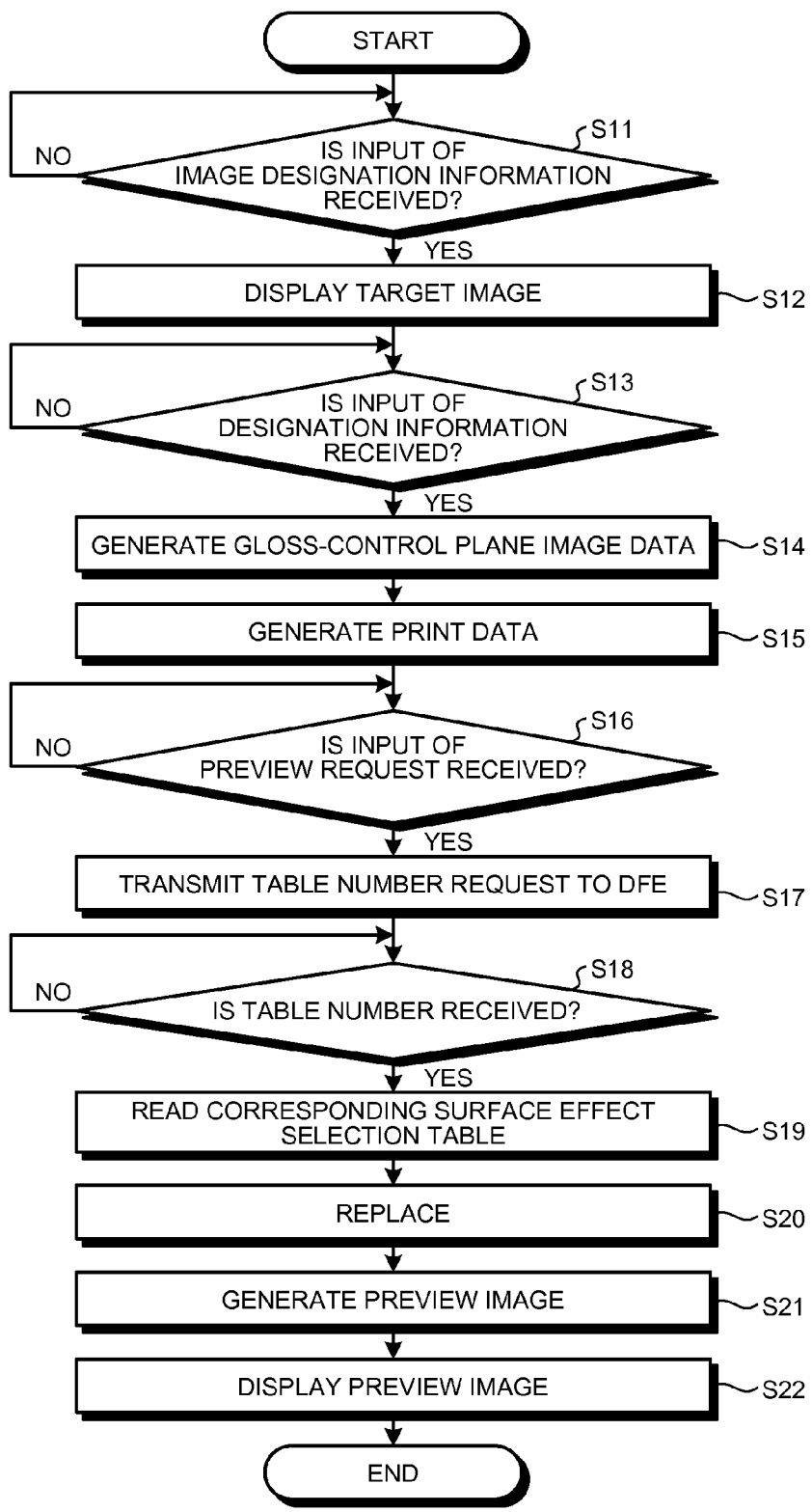
FIG. 22 is a flowchart illustrating an example of a preview image display process.

Next, a preview image display process executed by the host device 10 of the embodiment is executed. FIG. 22 is a flowchart illustrating an example of the preview image display process executed by the host device 10 (the control unit 15). Note that the example of the process shown below will be explained as to an example in which no transparent image is designated and no clear plane image data is generated.

As illustrated in FIG. 22, first, when the input control unit 120 receives an input of the image designation information (result at step S11: YES), the image display control unit 121 controls the display unit 14 so that an image designated by the received image designation information is displayed thereon (step S12). Next, when the input control unit 120 receives an input of designation information (result at step S13: YES), the plane data generating unit 122 generates the gloss-control plane image data based on the received designation information (step S14). The plane data generating unit 122 generates document data by integrating the gloss-control plane image data and the image data of the target image and delivers the document data to the print data generating unit 123.

Next, the print data generating unit 123 generates print data based on the document data (step S15). Next, when the input control unit 120 receives an input of a preview request for requesting a display of a preview image (result at step S16: YES), the table number requesting unit 124 controls the I/F unit 11 so that the table number request is transmitted to the DFE 30 thereby (step S17).

Next, when the obtaining unit 125 obtains a table number from the DFE 30 as a response to the table number request (result at step S18: YES), the replacing unit 126 reads a surface effect selection table corresponding to the table number obtained by the obtaining unit 125 from the storage unit 12 (step S19). Next, the replacing unit 126 replaces the type of the surface effect designated by the user in the gloss-control plane image data generated by the plane data generating unit 122 with a type of a practicable surface effect referring to the read surface effect selection table (step S20).

Figure 23:
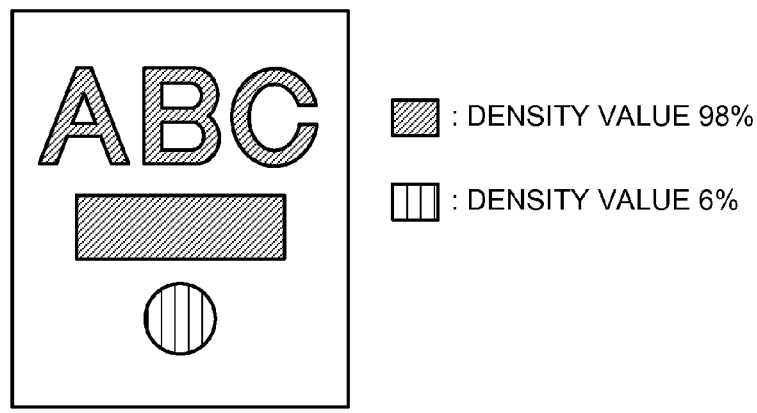
FIG. 23 is a view illustrating an example of gloss-control plane image data in which a designated type of a surface effect is replaced with a type of a surface effect which can be realized by a device configuration of a printing apparatus.

As an example, a case is assumed in which the table number obtained by the obtaining unit 125 is "2", that is, in which the glosser 70 and the low-temperature fixing post-processing device 90 are mounted as the post-processor 60 (the normal fixing post-processing device 80 is not mounted) and "priority-on-gloss" is designated (refer to FIG. 7). In the case, a surface effect selection table corresponding to the device configuration information and the priority information becomes the surface effect selection table of FIG. 13. In the case, the replacing unit 126 replaces the type of the surface effect designated by the user in the gloss-control plane image data with a type of a practicable surface effect referring to the surface effect selection table of FIG. 13. When this is explained exemplifying an example of gloss-control plane image data of FIG. 20, the type of the surface effect applied to the rectangular area to which the surface effect "G" is designated by the user is replaced with "PG" (refer to FIG. 13) and the type of the surface effect applied to the circular area to which "M" is designated by the user is replaced with "PM" (refer to FIG. 13). That is, the replacing unit 126 replaces a density value of the rectangular area to which "G" is designated by the user from "90%" to "98%" and replaces a density value of the circular area to which "M" is designated from "16%" to "6%", thereby generating gloss-control plane image data as illustrated in FIG. 23.

Next, the preview image generating unit 127 generates the preview image based on the gloss-control plane image data to which the replacement has been executed at step S20 and on the image data of the target image (step S21). The preview image display control unit 128 controls the display unit 14 so that the preview image generated by the preview image generating unit 127 is displayed thereon (step S22). Thereafter, when the input control unit 120 receives an input of a print instruction for instructing an execution of print, the host device 10 transmits the print data generated at step S15 to the DFE 30, which will not be explained here in detail.

In the embodiment, display patterns corresponding to a type of the surface effects are previously determined, and the area to which "PG" is applied is displayed by a display pattern corresponding to "PG" (for example, a pattern illustrated by plural slant lines directed from upper right to lower left), the area to which "G" is applied is displayed by a pattern corresponding to "G" (for example, a pattern illustrated plural slant lines directed from upper left to lower right), the area to which "M" is applied is displayed by a pattern corresponding to "M" (a pattern illustrated by plural straight lines extending in a horizontal direction in parallel with each other), and an area to which "PM" is applied is displayed by a pattern corresponding to "PM" (a pattern illustrated by plural straight lines extending in a vertical direction in parallel with each other). Note that the display method of the display pattern is not limited to the above method and is optional, and display pattern may be shown by colored layers or may be displayed by gloss caused by a reflection of light by setting a light source for a 3D display. Further, an area whose type of a surface effect is replaced with a type different from the type of the surface effect designated by the user may be displayed by being emphasized. A method of the emphasized display is optional, and, for example, the area may be displayed by different color or may be displayed by blinking or by an alarm display.

Further, it is also possible to execute the replacement using a surface selection effect table corresponding to a table number different from the table number obtained at step S18 described above and to display a preview image based on a result of the replacement. For example, even if the obtained table number is "2", it is also possible to execute the replacement using a surface effect selection table corresponding to a table number "3" and to execute a preview display based on a result of the replacement together with the preview display based on the surface effect selection table corresponding to the table number "2". In the case, even if the device configuration of the post-processor 60 is the same, since a preview image when "priority-on-gloss" is designated can be compared with a preview image when "priority-on-type" is designated, the user can determine that in any of "priority-on-gloss" and "priority-on-type" a print is executed.

As described above, in the embodiment, since a preview display is executed based on the gloss-control plane image data in which a type of a surface effect designated by the user is replaced with a type of a surface effect that can be realized by the device configuration of the printing apparatus 20, an advantageous effect is achieved in that a preview display near to a result of actual print can be realized.

Second Embodiment

Next, a second embodiment will be explained. In the second embodiment, a table number is specified according to device configuration information and number of times information to be described later and a surface effect selection table corresponding to the table number is disposed to each of the host device 10 and the DFE 30. Hereinafter, a portion different from the first embodiment will be mainly described. A portion common to the first embodiment is denoted by the same reference numeral and an explanation thereof is appropriately omitted.

Figure 24:
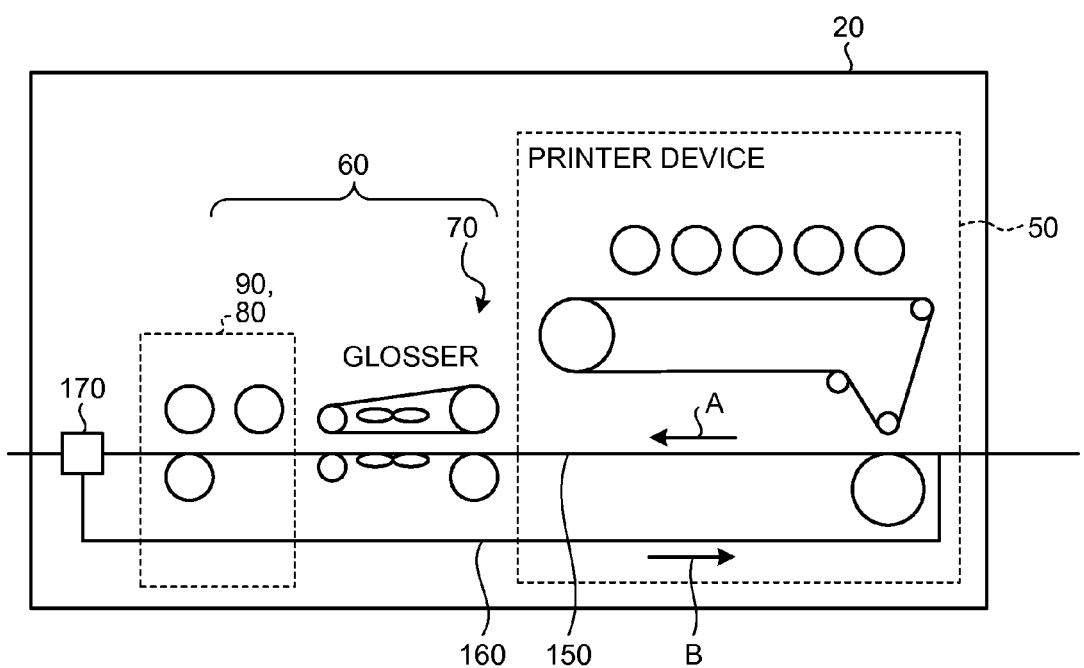
FIG. 24 is a view illustrating an example of a schematic configuration of a printing apparatus of a second embodiment.

FIG. 24 is a view illustrating an example of a schematic configuration of a printing apparatus 20 of the second embodiment. As illustrated in FIG. 24, the printing apparatus 20 includes a first conveying path 150, a second conveying path 160, and a switching unit 170. The first conveying path 150 is a conveying path for conveying a recording medium from the printer device 50 to the post-processor 60 and conveying the recording medium having passed through the post-processor 60 to the outside. As illustrated in FIG. 24, a conveying direction of the first conveying path 150 is a direction A from the printer device 50 side to the post-processor 60 side. The second conveying path 160 is a conveying path for returning the recording medium having passed through the post-processor 60 to a position upstream of the printer device 50 in the first conveying path 150. When the recording medium is conveyed by the first conveying path 150, various processes are executed by the printer device 50 and the post-processor 60, and when the recording medium is conveyed by the second conveying path 160, the various processes are not executed.

As illustrated in FIG. 24, a conveying direction of the second conveying path 160 is a direction B opposite to the conveying direction A of the first conveying path 150. The switching unit 170 is a unit for switching a conveying path of the recording medium having passed through the post-processor 60 to any of the first conveying path 150 and the second conveying path 160 under the control of the DFE 30.

In the embodiment, the user can input number of times information for designating a number of times the recording medium is conveyed by the first conveying path 150 (a number of times the recording medium passes through the printer device 50 and the post-processor 60) in a first print by operating an input unit 34. Note that an input method of the number of times information is optional and is not limited to the method described above. A case in which "1" is designated as the number of times information is called that "1 path" is designated, and a case in which "2" is designated may be also called that "2 path" is designated. The DFE 30 controls the switching unit 170 so that a number of time the recording medium is conveyed by the first conveying path 150 in a print executed once becomes a number of times designated by the number of times information input by the user.

Figure 25:
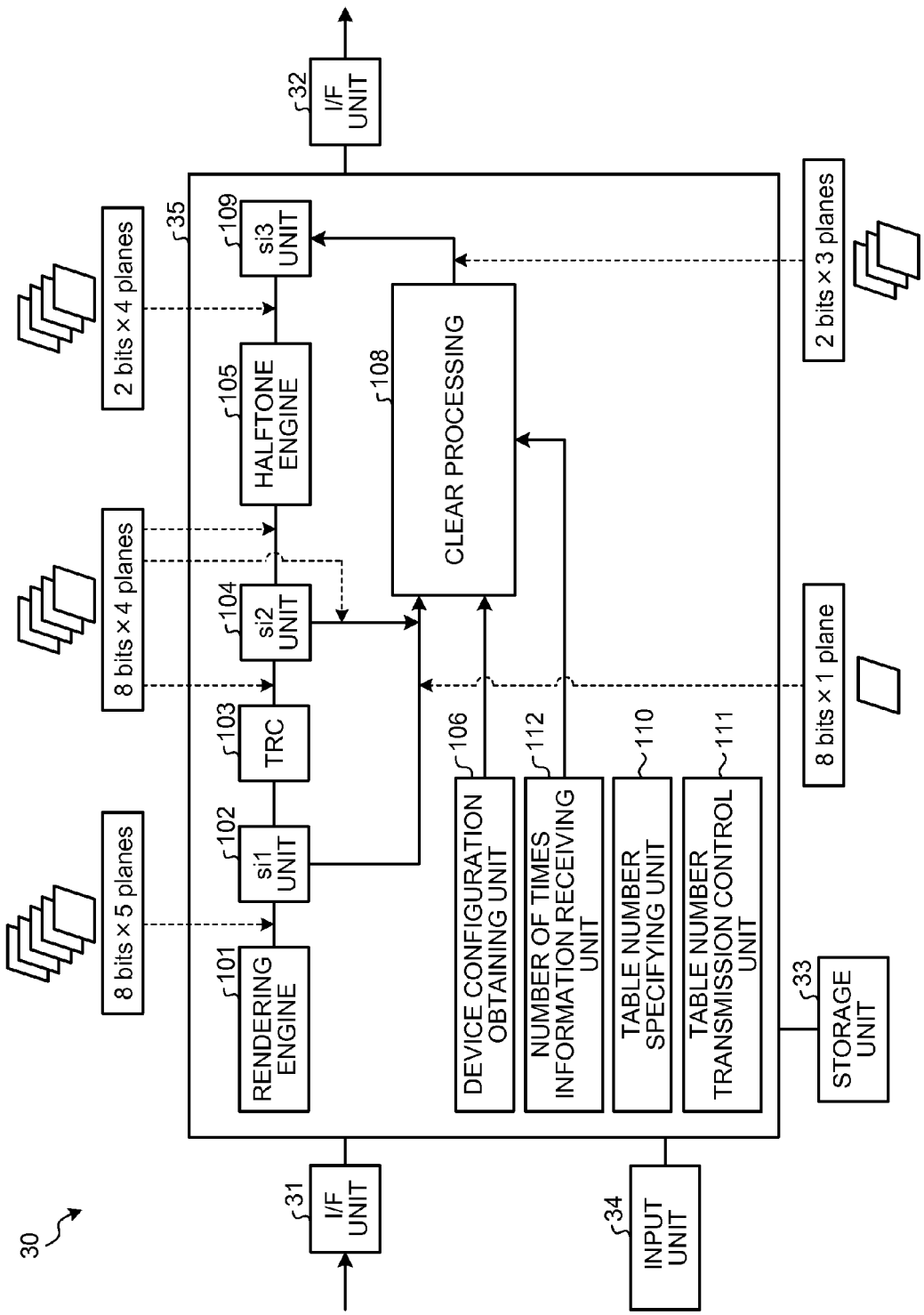
FIG. 25 is a view illustrating an example of a configuration of a DFE of the second embodiment.

FIG. 25 is a block diagram illustrating an example of a configuration of the DFE 30 of the embodiment. As illustrated in FIG. 25, the embodiment is different from the first embodiment in that a number of times information receiving unit 112 is included in place of the priority information receiving unit 107 as a function disposed to a control unit 35. The number of times information receiving unit 112 receives an input of the number of times information and outputs the received number of times information to a clear processing 108. The clear processing 108 determines on or off of a glosser 70 referring to the input device configuration information and a surface effect selection table (to be described later) corresponding to the number of times information and generates 2-bit clear plane clear image data (clear toner plane image data) for adhering a clear toner using the input gloss-control plane image data. Specific contents will be explained below.

A storage unit 33 is stored with a reference table which stores the device configuration information and the number of times information, and a table number by causing them to correspond to each other. FIG. 26 is a view illustrating an example of the reference table.

Further, the storage unit 33 is stored with plural types of surface effect selection tables that correspond to plural types of table numbers by 1:1. Each surface effect selection table stores a density value of gloss-control plane image data shown in a range of 0% to 98%, a density value of gloss-control plane image data shown in a range of 0 to 255, a type of a surface effect designated by the user, on/off information for designating any of on and off of the glosser 70, a determine method of a density value of clear toner plane image data, and a type of a practicable surface effect by causing them to correspond to each other. Contents of each surface effect selection table is determined according to the device configuration information and the number of times information are different in each table number.

The clear processing 108 specifies a table number corresponding to the device configuration information and the number of times information input thereto referring to the reference table illustrated in FIG. 26 and reads a surface effect selection table corresponding to the specified table number from the storage unit 33. For example, a case is assumed in which the glosser 70 and a low-temperature fixing post-processing device 90 are mounted as the post-processor 60 and "2 paths" are designated. In the case, as can be understood also from FIG. 26, a table number corresponding to the device configuration information and the number of times information is "4".

FIG. 27 is a view illustrating an example of a surface effect selection table corresponding to the table number "4". When a density value of a pixel included in the gloss-control plane image data is 238 to 255 (94% to 98%), an example of FIG. 27 illustrates that a type of a surface effect designated by the user is PG (Premium Gloss), on/off information at a second time of conveyance is "on", the on/off information at a second time of conveyance is "off", a density value of the pixel in first clear toner plane image data Clr-1 (hereinafter, simply shown as "Clr-1") used at the first time of conveyance is determined by "inverse mask 1" and shown by 8-bit, the pixel in Clr-1 used at the second time of conveyance has no density value, the pixel in third clear toner plane image data Clr-3 (hereinafter, simply shown as "Clr-3") used at the first time of conveyance has no density value, the pixel in Clr-3 used at the second time of conveyance has no density value, and a type of a realized surface effect is "PG", corresponding to the density value of the pixel.

When the density value of the pixel included in the gloss-control plane image data is 212 to 232 (84% to 90%), the example of FIG. 27 illustrates that the type of the surface effect designated by the user is G (Gloss), the on/off information at the first time of conveyance is "on", the on/off information at the second time of conveyance is "off", the density value of the pixel in Clr-1 used at the first time of conveyance is determined by "inverse mask m", the density value of the pixel in the Clr-1 used at the second time of conveyance is determined by "solid", the pixel in Clr-3 used at the first time of conveyance has no density value, the pixel in the Clr-3 used at the second time of conveyance has no density value, and the type of the realized surface effect is "G", corresponding to the density value of the pixel.

When the density value of the pixel included in the gloss-control plane image data is 23 to 43 (10% to 16%), the example of FIG. 27 illustrates that the type of the surface effect designated by the user is M (Matte), the on/off information at the first time of conveyance is "on", the on/off information at the second time of conveyance is "off", the pixel in the Clr-1 used at the first time of conveyance has no density value, the density value of the pixel in the Clr-1 used at the second time of conveyance is determined by "halftone-n", the pixel in the Clr-3 used at the first time of conveyance has no density value, the pixel in the Clr-3 used at the second time of conveyance has no density value, and the type of the realized surface effect is "M", corresponding to the density value of the pixel.

Further, when the density value of the pixel included in the gloss-control plane image data is 1 to 17 (0% to 6%), the example of FIG. 27 illustrates that the type of the surface effect designated by the user is PM (Premium Matte), the on/off information at the first time of conveyance is "on", the on/off information at the second time of conveyance is "off", the pixel in the Clr-1 used at the first time of conveyance has no density value, the pixel in the Clr-1 used at the second time of conveyance has no density value, the pixel in the Clr-3 used at the first time of conveyance has no density value, the density value of the pixel in the Clr-3 used at the second time of conveyance is determined by "solid", and the type of the realized surface effect is "PM", corresponding to the density value of the pixel.

An explanation will be made returning to FIG. 25 again. The clear processing 108 determines on or off of the glosser 70 at each of the first time of conveyance and the second time of conveyance (in the case, "on" at the first time and "off" at the second time) referring to the surface effect selection table of FIG. 27 and generates 8-bit Clr-1 at each of the first time of conveyance and the second time of conveyance using the gloss-control plane image data input thereto. The clear processing 108 executes the halftone process to the 8-bit Clr-1 at each of the first time of conveyance and the second time of conveyance, converts the 8-bit Clr-1 to 2-bit Clr-1, and outputs the 2-bit Clr-1 to an Si3 unit 109. The Si3 unit 109 generates first image data by integrating the respective CMYK 2-bit image data having been subjected to the halftone process and the respective 2-bit Clr-1 and the Clr-3 used at the first time of conveyance and generates second image data by integrating the respective CMYK 2-bit image data having been subjected to the halftone process and the respective 2-bit Clr-1 and the Clr-3 used at the second time of conveyance.

The DFE 30 executes a print control process for controlling the printer device 50 and the post-processor 60 so that prints are executed based on the first image data and the second image data. FIG. 28 is a flowchart illustrating an example of the print control process executed by the DFE 30. As illustrated in FIG. 28, first, the DFE 30 controls the printer device 50 and the post-processor 60 so that a print is executed based on the first image data (image formation) (step S30). More specifically, the DFE 30 outputs CMYK color plane image data and Clr-1 used at the first time of conveyance to the printer device 50 via the MIC 40. Further, the DFE 30 outputs the on/off information for designating "on" to the glosser 70 via the MIC 40. On receiving the on/off information, the glosser 70 transits to an on-state. Further, the DFE 30 outputs the Clr-3 used at the first time of conveyance to the low-temperature fixing post-processing device 90 via the MIC 40.

The printer device 50 forms toner images according to respective toners on a photosensitive element using the CMYK color plane image data output from the MIC 40 and the Clr-1 used at the first time of conveyance and radiating a light beam from an exposing unit and fixes the toner images after the toner images have been transferred onto the recording medium. With the operation, the CMYK toners and the clear toner are adhered onto the recording medium and an image is formed. Thereafter, when the recording medium has been conveyed along a conveying path and has reached the position of the glosser 70 in the on-state, the glosser 70 presses the recording medium at high temperature and high pressure.

The low-temperature fixing post-processing device 90 forms a toner image by the clear toner using the Clr-3 output from the MIC 40, overlaps the toner image on the recording medium having passed through the glosser 70, and fixes the toner image on the recording medium by heating and pressing the toner image at low temperature. With the operation, the print based on the first image data is finished (print at the first time of conveyance is finished).

Next, the DFE 30 executes switch control for switching the conveying path through which the recording medium has passed the post-processor 60 to any of the first conveying path 150 and the second conveying path 160 according to the designated number of times information (step S31). When "1" is designated by the number of times information, the DFE 30 controls the switching unit 170 so that the conveying path of the recording medium having passed through the post-processor 60 is switched to the first conveying path 150, whereas when "2" is designated by the number of times information, the DFE 30 controls the switching unit 170 so that the conveying path of the recording medium having passed through the post-processor 60 is switched to the second conveying path 160. Since "2" is designated here by the number of times information, the DFE 30 controls the switching unit 170 so that the conveying path of the recording medium, which has passed through the post-processor 60, is switched to the second conveying path 160.

Next, a process goes to step S32 at which the DFE 30 determines whether or not the conveying path of the recording medium has been switched to the second conveying path 160. When it is determined that the conveying path of the recording medium has been switched to the second conveying path 160 (step S32: YES), the process goes to step S33, whereas when it is determined that the conveying path of the recording medium has not been switched to the second conveying path 160 (step S32: NO), the process is finished.

At step S33, the DFE 30 controls the printer device 50 and the post-processor 60 so that a print based on the second image data (image formation) is executed. More specifically, the DFE 30 outputs the CMYK color plane image data and the Clr-1 used at the second time of conveyance to the printer device 50 via the MIC 40. Further, the DFE 30 outputs the on/off information for designating "on" to the glosser 70 via the MIC 40. On receiving the on/off information, the glosser 70 transits to the on-state. Further, the DFE 30 outputs the Clr-3 used at the second time of conveyance to the low-temperature fixing post-processing device 90 via the MIC 40.

The printer device 50 forms toner images according to the respective toners on the photosensitive element using the CMYK color plane image data output from the MIC 40 and the Clr-1 used at the second time of conveyance and radiating a light beam from the exposing unit and fixes the toner images after the toner images have been transferred onto the recording medium. With the operation, the CMYK toners and the clear toner are adhered onto the recording medium and an image is formed. Thereafter, when the recording medium is conveyed along the conveying path and reaches the position of the glosser 70 in the on-state, the glosser 70 presses the recording medium at high temperature and high pressure.

The low-temperature fixing post-processing device 90 forms a toner image by a clear toner using the Clr-3 outputs from the MIC 40 and used at the second time of conveyance, overlaps the toner image on the recording medium having passed through the glosser 70, and fixes the toner image on the recording medium by heating and pressing the toner image at low temperature. With the operation, the print based on the second image data is finished (print at the second time of conveyance is finished) and the print control process is finished. When the print control process described above is executed, as illustrated in FIG. 29, an effect as PG is realized in an area to which PG (Premium Gloss) is designated by the user, and an effect as G is realized in an area to which G (Gloss) is designated by the user. Further, an effect as M is realized in an area to which M (Matte) is designated by the user, and an effect as PM is realized in a area to which PM (Premium Matte) is designated by the user. That is, even if a normal fixing post-processing device 80 is not mounted as the post-processor 60, all the four types of surface effects, i.e., PG (Premium Gloss), G (Gloss), M (Matte), and PM (Premium Matte) can be realized. Note that any of the surface effects is not applied to an area which is not designated as an area to which a surface effect is applied.

Further, in the embodiment, the plural types of the surface effect selection table described above are stored also in the storage unit 12 of the host device 10. The other configurations are the same as those of the first embodiment. Also in the second embodiment, since a preview display is executed based on the gloss-control plane image data in which a type of a surface effect designated by the user is replaced with a type of a practicable surface effect, an advantageous effect is achieved that a preview display near to a result of actual print can be realized.

Third Embodiment

In respective embodiments described above, although the host device 10 is configured to execute the preview image display process, the embodiments are not limited thereto.

That is, the embodiments may be configured such that any of plural processes executed by a device is executed by at least a device connected to the device via a network.

As an example of the configuration, an image forming system according to the embodiment mounts a part of a function of a host device on a server device on a network.

Figure 30:
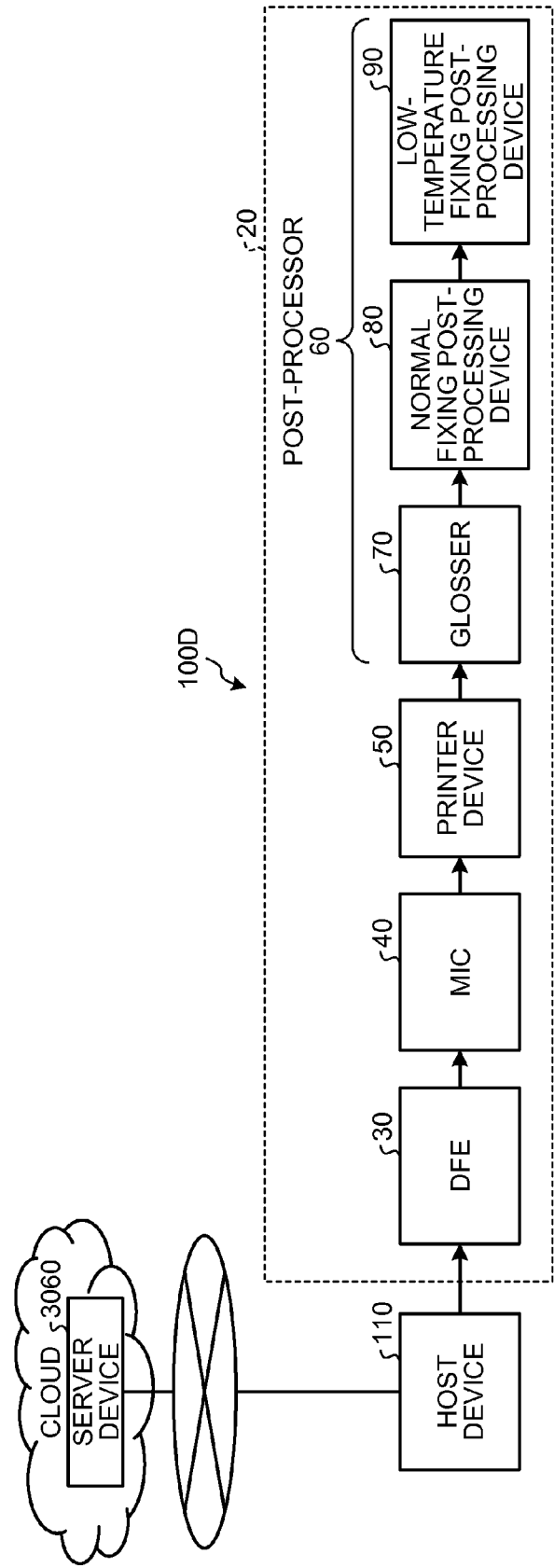
FIG. 30 is a view exemplifying a configuration of a printing system of a third embodiment.

FIG. 30 is a view exemplifying a configuration of an image forming system 100D according to the embodiment. As illustrated in FIG. 30, the image forming system 100D includes a host device 110 and the printing apparatus 20.

The embodiment is configured such that the host device 110 is connected to a server device 3060 via a network such as the Internet, and the like. Further, in the embodiment, functions of a plane data generating unit 122, a print data generating unit 123, a table number requesting unit 124, an obtaining unit 125, a replacing unit 126, and a preview image generating unit 127 in the host device 10 of the embodiment are disposed to the server device 3060. Note that a configuration of the printing apparatus 20 is the same as that of the above embodiments.

That is, specifically, the embodiment is configured such that the host device 110 is connected to the single server device 3060 via a network (cloud) such as the Internet, the server device 3060 is disposed with the functions of the plane data generating unit 122, the print data generating unit 123, the table number requesting unit 124, the obtaining unit 125, the replacing unit 126, and the preview image generating unit 127 of the embodiment, and the server device 3060 executes a process for generating the preview image.

Figure 31:
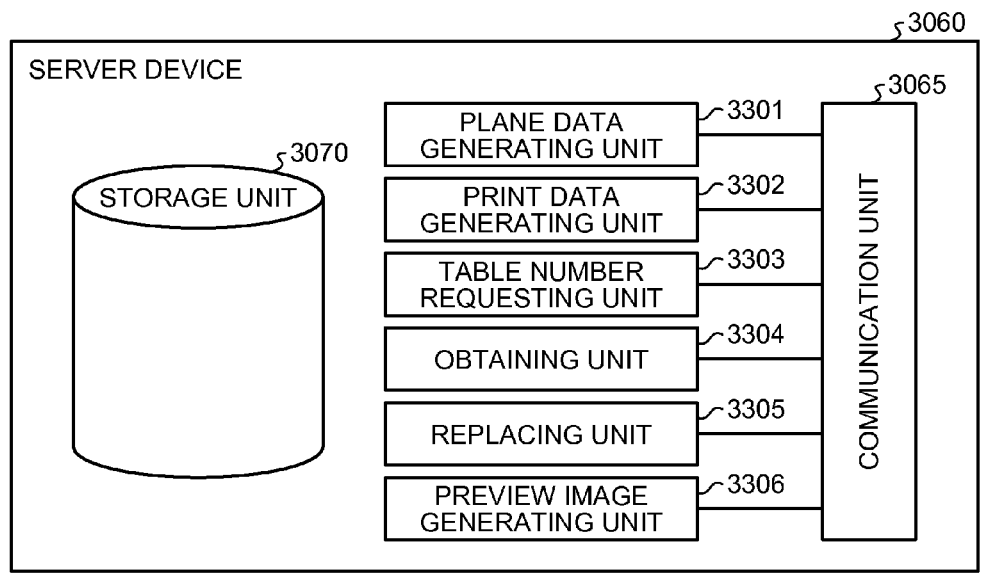
FIG. 31 is a block diagram illustrating a functional configuration of a server device of the third embodiment.

First, the server device 3060 will be explained. FIG. 31 is a block diagram illustrating a functional configuration of the server device 3060 according to the embodiment. The server device 3060 main includes a storage unit 3070, a plane data generating unit 3301, a print data generating unit 3302, a table number requesting unit 3303, an obtaining unit 3304, a replacing unit 3305, a preview image generating unit 3306, and a communication unit 3065.

The storage unit 3070 is a storage medium such as an HDD and memory and stores various types of data such as the density value selection table and the plural types of the surface effect selection tables described above. Respective functions of the plane data generating unit 3301, the print data generating unit 3302, the table number requesting unit 3303, the obtaining unit 3304, the replacing unit 3305, and the preview image generating unit 3306 are the same as the respective functions of the plane data generating unit 122, the print data generating unit 123, the table number requesting unit 124, the obtaining unit 125, the replacing unit 126, and the preview image generating unit 127 in the host device 10 of the embodiment. The communication unit 3065 is an interface device for making a communication between the communication unit 3065 and the host device 110.

Next, the host device 110 will be explained.

Figure 32:
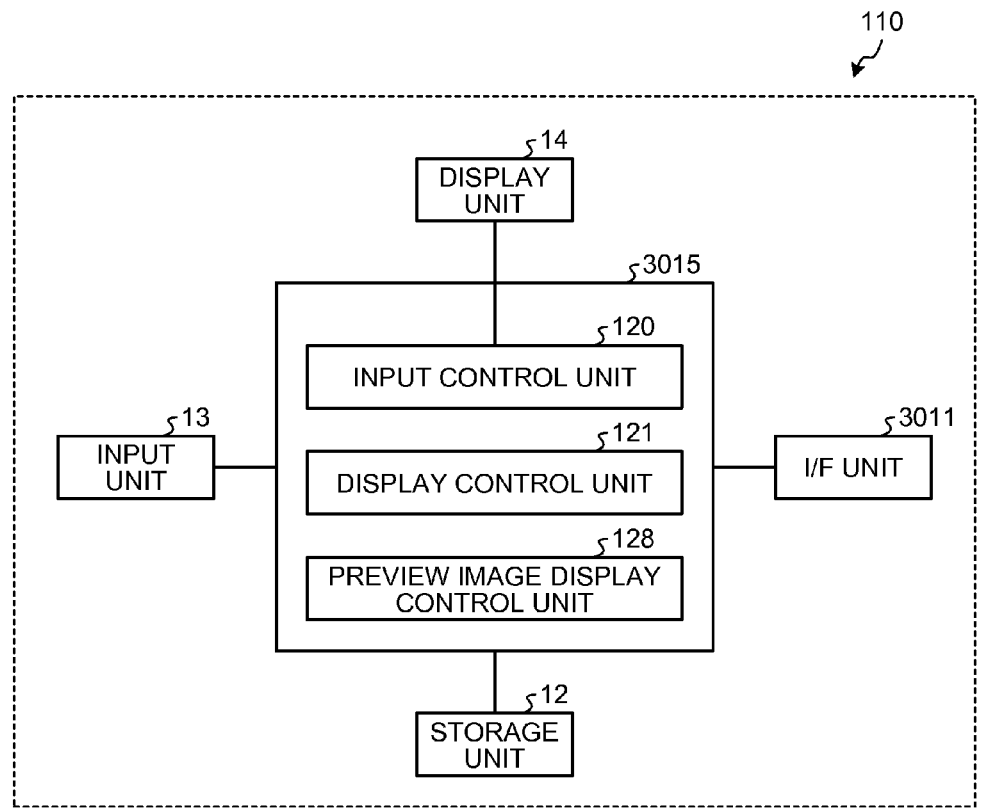
FIG. 32 is a block diagram illustrating a functional configuration of a host device of the third embodiment.

FIG. 32 is a function block diagram illustrating the host device 110. The host device 110 mainly includes a storage unit 12, an input unit 13, a display unit 14, a control unit 3015, and an I/F unit 3011. The control unit 3015 includes an input control unit 120, a display control unit 121, and a preview image display control unit 128. Respective functions of the input control unit 120, the display control unit 121, and the preview image display control unit 128 are the same as those of the above embodiments. The I/F unit 3011 can transmit data between the I/F unit 3011 and the DFE 30 and the server device 3060, respectively.

Next, the preview image display process executed by the host device 110 and the server device 3060 of the embodiment will be explained.

Figure 33:
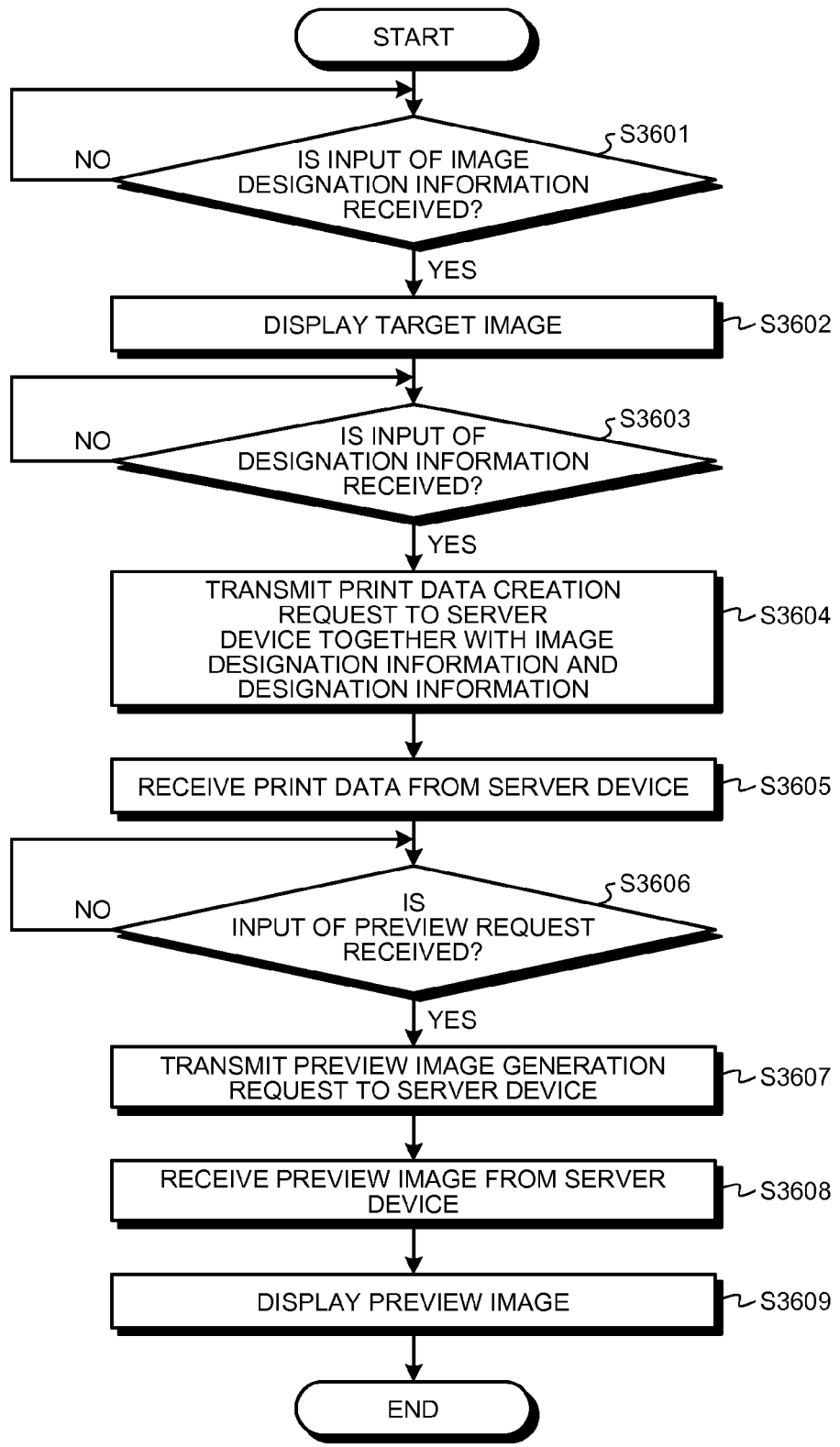
FIG. 33 is a flowchart illustrating an example of a process executed by a host of the third embodiment.

FIG. 33 is a flowchart illustrating a procedure of the process executed by the host device 110. As illustrated in FIG. 33, first, when the input control unit 120 receives an input of the image designation information, (result at step S3601: YES), the image display control unit 121 controls the display unit 14 so that an image designated by the received image designation information is displayed thereon (step S3602). Next, when the input control unit 120 receives an input of designation information, (result at step S3603: YES), the I/F unit 3011 transmits a print data generation request to the server device 3060 together with the image designation information and the designation information input thereto (step S3604).

When the print data is generated by the server device 3060, the I/F unit 3011 receives the print data (step S3605). Next, when the input control unit 120 receives an input of a preview request for requesting a display of a preview image (result at step S3606:YES), the I/F unit 3011 transmits a preview image generation request to the server device 3060 (step S3607).

When the preview image is generated by the server device 3060, the I/F unit 3011 receives the preview image (step S3608). Next, the preview image display control unit 128 controls the display unit 14 so that the preview image generated by the server device 3060 is displayed thereon (step S3609).

Figure 34:
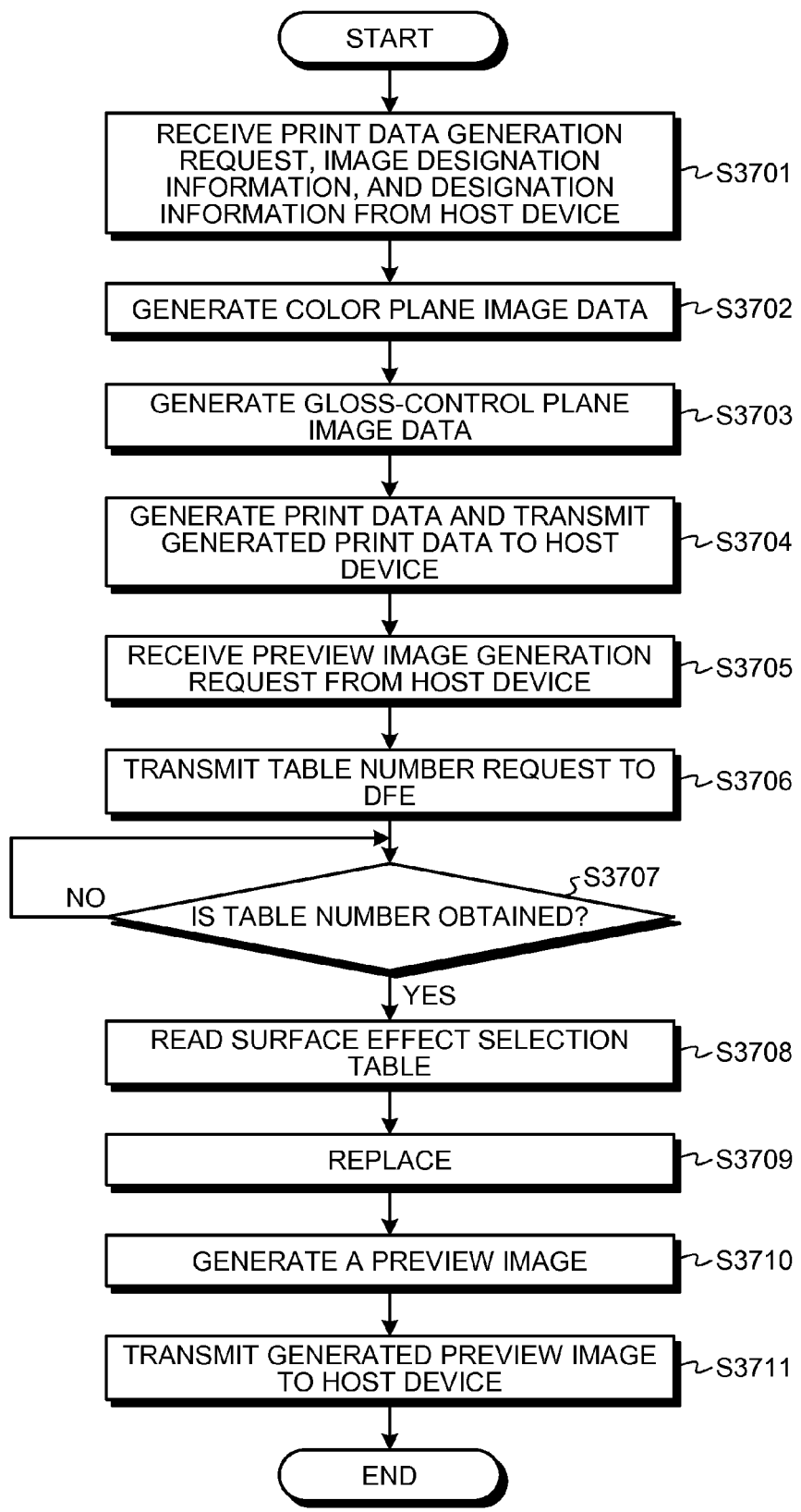
FIG. 34 is a flowchart illustrating an example of a process executed by the server device of the third embodiment.

FIG. 34 is a flowchart illustrating a procedure of a process executed by the server device 3060. As illustrated in FIG. 34, when the communication unit 3065 receives the print data generation request, the image designation information, and the designation information from the host device 110 (step S3701), the plane data generating unit 3301 first generates color plane image data based on the image designation information (step S3702). Next, the plane data generating unit 3301 generates gloss-control plane image data based on the designation information (step S3703). The plane data generating unit 3301 generates document data by integrating the color plane image data and the gloss-control plane image data and delivers the document data to the print data generating unit 3302.

Next, the print data generating unit 3302 generates print data based on the document data, and the communication unit 3065 transmits the generated print data to the host device 110 as a response to the print data generation request (step S3704).

Next, when the communication unit 3065 receives the preview image generation request from the host device 110 (step S3705), the table number requesting unit 3303 transmits a table number request to the DFE 30 via the communication unit 3065 (step S3706). Next, when the obtaining unit 3304 obtains a table number from the DFE 30 via the communication unit 3065 as a response to the table number request (when result at step S3707: YES), the replacing unit 3305 reads a surface effect selection table corresponding to the table number obtained by the obtaining unit 3304 from the storage unit 3070 (step S3708). Next, the replacing unit 3305 replaces a type of a surface effect designated by a user in the gloss-control plane image data generated by the plane data generating unit 3301 with a type of a practicable surface effect referring to the read surface effect selection table (step S3709). Next, the preview image generating unit 3306 generates a preview image based on the gloss-control plane image data and the color plane image data having been replaced at step S3709 (step S3710). The communication unit 3065 transmits the generated preview image to the host device 110 as a response to the preview image generation request (step S3711).

As described above, in the embodiment, since the preview image is generated by the server device 3060 on the cloud, even when plural host devices 110 exist, preview images can be generated collectively, in addition the effect of the above embodiments, which is convenient to a manager.

Note that, the embodiment is configured such that the single server device 3060 on the cloud is disposed with the plane data generating unit 3301, the print data generating unit 3302, the table number requesting unit 3303, the obtaining unit 3304, the replacing unit 3305, and the preview image generating unit 3306, the configuration of the embodiment is not limited thereto.

For example, at least two server devices may be disposed on the cloud, and the respective processes may be executed by the at least two server devices in a distribution system. Note that a fashion for distributing the respective processes to the respective servers is not limited thereto, and respective processes can be optionally distributed.

That is, when the host device 110 is provided with a minimum configuration including the input unit 13, the display unit 14, the input control unit 120, the display control unit 121, and the I/F unit 3011, it is optional to intensively distribute a part or all of the respective processes to the single server device on the cloud or to distribute the respective processes to the plural server devices.

In other words, it can be configured such that any of the plural processes executed by the single device as in the example described above can be executed by at least one other device connected to the single device via the network.

When the processes are executed by "the configuration in which at least one other device is connected to the single device via the network", the configuration includes a data input/output step executed between the single device and the other device and further executed between the other devices such as a step at which data (information) generated in a process executed by the single device is output from the single device to the other device and a step at which the other device is input with the data.

Specifically, when other device is a single device, the configuration becomes such that a data input/output process executed between a single device and the other device is included therein, and when other devices are at least two devices, the configuration becomes such that a data input/output process executed between the single device and the other devices and a data input/output process executed between a first other device and a second other device are included therein.

Further, in the embodiment, although one or plural server devices of the server device 3060 and the like are disposed on the cloud, the embodiment is not limited thereto. For example, one or plural server devices of the server device 3060 may be configured to be disposed on any of networks such as an intranet.

Next, a hardware configuration of the host devices 10, 110, the DFE 30, and the server device 3060 of the embodiment described above will be explained. FIG. 30 is a block diagram illustrating an example of the hardware configuration of the host devices 10, 110, the DFE 30, and the server device 3060 of the embodiment. The host devices 10, 110, the DFE 30, and the server device 3060 of the embodiment include a control device 1010 such as a CPU, a main storage device 1020 such as a ROM and a RAM, an auxiliary storage device 1030 such as a HDD and a CD drive device, a display device 1040 such as a display device, and an input device 1050 such as a key board and a mouse and have a hardware configuration making use of an ordinary computer.

A program executed by the host devices 10, 110, the DFE 30 and the server device 3060 of the embodiment is a file having an installable format or an executable format and provided by being recorded to a recording medium such as a CD-ROM, a flexible disk (FD), a CD-R, a digital versatile disk (DVD) which can be read by a computer.

The program, which is executed by the host devices 10, 110, the DFE 30, and the server device 3060 of the embodiment, may be configured such that the program is provided by being stored on a computer connected to a network such as the Internet and downloaded via the network. Further, the program executed by the host devices 10, 110, the DFE 30, and the server device 3060 of the embodiment may be configured so that the program is provided or delivered via the network such as the Internet. Further, a control program executed by the host devices 10, 110, the DFE 30, and the server device 3060 of the embodiment may be configured so that the control program is provided by being previously assembled to a ROM and the like.

The program executed by the host devices 10, 110, the DFE 30, and the server device 3060 of the embodiment is composed of a module including the respective units described above, and, as actual hardware, the respective units are loaded on the main storage device by the CPU (processor), which reads the control program from the storage medium and executes the program, and are generated on the main storage device. Note that, in embodiment described above, although the host devices 10, 110, the DFE 30, and the server device 3060 execute the process according to the embodiment, the embodiment is not limited thereto, and a type of a device for executing the process is optional, and, for example, a PC can also execute the process.

Note that, for example, the host device 10 (110) and the printing apparatus 20 may be formed integrally and may be configured as a single image forming apparatus. Further, the MIC 40 and the printer device 50 may be integrally configured. Further, the image forming system of the embodiment is configured including the MIC 40, the image forming system is not limited thereto. A configuration in which the MIC 40 is not provided may be employed by disposing the process and the function executed by the MIC 40 to the other devices such as the DFE 30.

Figures 35, 36:
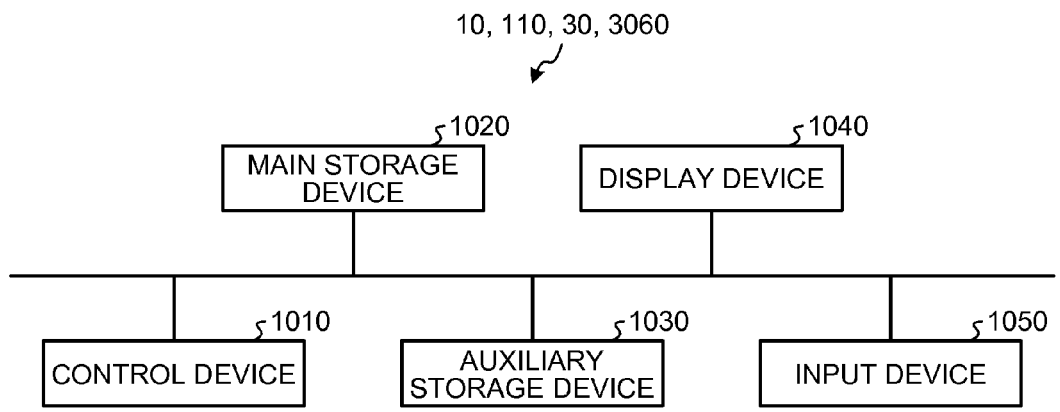
FIG. 35 is a block diagram illustrating an example of a hardware configuration of the host device, a DFE, and the server device.
FIG. 36 is a view illustrating an example of a replacement table.

Further, for example, the host device 10 may be a configuration having a replacement table as illustrated in FIG. 36 in place of the surface effect selection table described above. The replacement table is caused to correspond to the table number described above. A replacement table of FIG. 36 is a replacement table corresponding to the table number "2" illustrated in FIG. 7. As illustrated in FIG. 36, the replacement table stores a density value of the gloss-control plane image data, a type of a surface effect designated by the user, and a type of a practicable surface effect by causing them to correspond to each other. Even in the configuration, since the host device 10 can read a replacement table corresponding to the table number, which is obtained from the DFE 30, from the storage unit 12 and can execute a replacement at step S20 of FIG. 22 using the read replacement table, an effect similar to those of the respective embodiments described above can be achieved.

Further, for example, a configuration in which the host device 10 does not have the surface effect selection table may be employed. In the configuration, when the host device 10 receives an input of a preview request (result at step S16 of FIG. 22: YES), the host device 10 accesses the DFE 30 and obtains information (data structure) of a surface effect selection table corresponding to a device configuration of the printing apparatus 20 and priority information (or number of times information) at the time. The host device 10 can replace the type of the surface effect designated by the user in the gloss-control plane image data with the type of the practicable surface effect referring to the information of the obtained surface effect selection table. Further, a configuration in which the surface effect selection table is stored in an external device such as a server device independent of the image forming system 100 may be employed. In the configuration, the host device 10 and the DFE 30 access the external device and obtain the information of the surface effect selection table when necessary.

In short, it is sufficient that the host device 10 can obtain replacement information that is information according to the device configuration of the printing apparatus 20 and is used to replace a type of a surface effect which cannot be realized by the device configuration with a type a surface effect that can be realized by device configuration. Further, a type of the replacement information is option, and a table number which is specified according to the device configuration of the printing apparatus 20 and to the priority information (or the number of times information) can be as the replacement information and information (data structure) of a surface effect selection table can be employed as the replacement information as in the respective embodiments described above.

According to the embodiments, the display processing apparatus, the image forming system, the display processing method, and the program which can realize a preview display near to a print result can be provided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display processing apparatus comprising:
a receiving unit configured to receive designation information for designating an area to which a surface effect is applied in image data and a type of the surface effect;
a gloss-control plane generating unit configured to generate gloss-control plane data for specifying a type of a surface effect applied to a recording medium and an area in a recording medium to which the surface effect is applied based on the designation information;
an obtaining unit configured to obtain replacement information that is information depending on a device configuration of a printing apparatus for forming an image to the recording medium based on the image data, the replacement information being used to replace a type of the surface effect that is not available in the device configuration with a type of the surface effect that is available in the device configuration;
a replacing unit configured to replace the type of the surface effect designated by the designation information with the type of the available surface effect using the replacement information obtained by the obtaining unit;
a preview image generating unit configured to generate a preview image illustrating an image that estimates a result of print executed by the printing apparatus based on the gloss-control plane data having an area to which the available surface effect is to be applied; and
a display unit configured to display the preview image generated by the preview image generating unit.

2. The display processing apparatus according to claim 1, further comprising a plurality of types of tables that correspond to a plurality of types of the replacement information one-to-one and store the type of the surface effect designated by the designation information and the type of the available surface effect in association with each other, wherein
the replacing unit replaces the type of the surface effect designated by the designation information with the type of the available surface effect using the table corresponding to the replacement information obtained by the obtaining unit.

3. The display processing apparatus according to claim 2, wherein the replacement information is information depending on the device configuration and to priority information for designating one of priority-on-gloss that indicates a type of the surface effect having a highest glossiness in a plurality of types of the surface effects that are available in the device configuration as the type of the surface effect to be replaced with and priority-on-type that indicates a type of a surface effect other than a type of the surface effect having the highest glossiness as the type of the surface effect to be replaced with.

4. An image forming system comprising:
a printing apparatus configured to form an image on a recording medium based on image data; and
a display processing apparatus configured to display a preview image illustrating an image that estimates a result of print executed by the printing apparatus, wherein
the display processing apparatus includes
a receiving unit configured to receive designation information for designating an area to which a surface effect is applied in image data and a type of the surface effect;
a gloss-control plane generating unit configured to generate gloss-control plane data for specifying a type of a surface effect applied to a recording medium and an area in a recording medium to which the surface effect is applied based on the designation information;
an obtaining unit configured to obtain replacement information that is information depending on a device configuration of the printing apparatus, the replacement information being used to replace a type of the surface effect that is not available in the device configuration with a type of the surface effect that is available in the device configuration;
a replacing unit configured to replace the type of the surface effect designated by the designation information with the type of the available surface effect using the replacement information obtained by the obtaining unit;
a preview image generating unit configured to generate the preview image based on the gloss-control plane data having an area to which the available surface effect is to be applied; and
a display unit configured to display the preview image generated by the preview image generating unit.

5. The image forming system according to claim 4, wherein the printing apparatus includes
a printer device configured to form a toner image using a color toner and a clear toner on the recording medium;
a post-processor including a first device for fixing the toner image on the recording medium formed by the printer device to the recording medium again and increasing a glossiness of the toner image by improving a smoothness of a surface of the toner image on the recording medium, and at least one second device for forming a toner image by the clear toner on the recording medium using clear toner plane data that is colorless image data generated based on the gloss-control plane data and fixing the toner image at a predetermined temperature, wherein
the replacement information is information depending on a configuration of the post-processor.

6. The image forming system according to claim 5, wherein the printing apparatus includes
a first conveying path configured to convey the recording medium from the printer device to the post-processor and convey the recording medium having passed through the post-processor to the outside;
a second conveying path configured to return the recording medium having passed through the post-processor to a position upstream of the printer device in the first conveying path without conveying the recording medium to the outside; and
a switching unit configured to switch the conveying path of the recording medium having passed through the post-processor to one of the first conveying path and the second conveying path, wherein
the replacement information is specified depending on number-of-times information for designating a number of times the recording medium is conveyed by the first conveying path in print executed once and depending on the device configuration.

7. A display processing method comprising:
- receiving designation information for designating an area to which a surface effect is applied in image data and a type of the surface effect;
- generating gloss-control plane data for specifying a type of a surface effect applied to a recording medium and an area in a recording medium to which the surface effect is applied based on the designation information;
- obtaining replacement information that is information depending on a device configuration of a printing apparatus for forming an image to the recording medium based on the image data, the replacement information being used to replace a type of the surface effect that is not available in the device configuration with a type of the surface effect that is available in the device configuration;
- replacing the type of the surface effect designated by the designation information with the type of the available surface effect using the replacement information;
- generating a preview image illustrating an image that estimates a result of print executed by the printing apparatus based on the gloss-control plane data having an area to which the available surface effect is to be applied; and
- displaying the generated preview image.

8. A non-transitory computer-readable storage medium with an executable program stored thereon, wherein the program instructs a processor to perform the display processing method according to claim 7.

* * * * *